United States Patent
Landis et al.

(10) Patent No.: US 11,647,530 B2
(45) Date of Patent: May 9, 2023

(54) TRANSMISSION CONFIGURATION INDICATOR (TCI) STATE GROUPS

(71) Applicant: QUALCOMM Incorporated, San Diego, CA (US)

(72) Inventors: Shay Landis, Hod Hasharon (IL); Ran Berliner, Kfar-Aviv (IL); Yehonatan Dallal, Kfar Saba (IL)

(73) Assignee: QUALCOMM Incorporated, San Diego, CA (US)

( * ) Notice: Subject to any disclaimer, the term of this patent is extended or adjusted under 35 U.S.C. 154(b) by 31 days.

(21) Appl. No.: 17/129,310

(22) Filed: Dec. 21, 2020

(65) Prior Publication Data
US 2022/0201695 A1 Jun. 23, 2022

(51) Int. Cl.
*H04W 72/04* (2009.01)
*H04W 72/08* (2009.01)
*H04W 72/044* (2023.01)

(52) U.S. Cl.
CPC ....... *H04W 72/085* (2013.01); *H04W 72/046* (2013.01)

(58) Field of Classification Search
CPC . H04W 24/08; H04W 72/042; H04W 72/046; H04W 72/085; H04B 7/0408; H04B 7/065; H04B 7/063
See application file for complete search history.

(56) References Cited

U.S. PATENT DOCUMENTS

2020/0076491 A1* 3/2020 Zhang .................. H04B 7/0695
2020/0266870 A1 8/2020 Yoon et al.
2020/0314818 A1* 10/2020 Jin ........................ H04B 7/0408
2020/0359404 A1* 11/2020 Nilsson .................. H04W 24/08
2021/0184733 A1* 6/2021 Cao ........................ H04B 7/063
2021/0368490 A1* 11/2021 Xu ........................ H04W 72/042
2021/0391912 A1* 12/2021 Hakola ................ H04B 7/0408
2022/0123872 A1* 4/2022 Zhang .................. H04L 5/0055

FOREIGN PATENT DOCUMENTS

WO 2018232090 A1 12/2018
WO 2020144637 A1 7/2020

OTHER PUBLICATIONS

Hua Zhou, New Features in the Next Release of 5G New Radio, Aug. 2020, Ofinno, pp. 1-5 (Year: 2020).*
International Search Report and Written Opinion—PCT/US2021/060632—ISA/EPO—dated Mar. 18, 2022.

* cited by examiner

*Primary Examiner* — Michael Thier
*Assistant Examiner* — Prince A Mensah
(74) *Attorney, Agent, or Firm* — Loza & Loza/Qualcomm Incorporated

(57) ABSTRACT

Aspects relate to transmission configuration indicator (TCI) state configuration in multi-stream communication between a radio access network (RAN) entity and a user equipment (UE). The UE may obtain a respective beam quality metric for each transmit beam of a plurality of transmit beams associated with the RAN entity and transmit a beam report to the RAN entity including a respective beam quality metric for each of the transmit beams. The RAN entity may then group the plurality of transmit beams into a plurality of beam groups based on the beam report and transmit a plurality of TCI state groups, each corresponding to a respective one of the beam groups, to the UE.

46 Claims, 17 Drawing Sheets

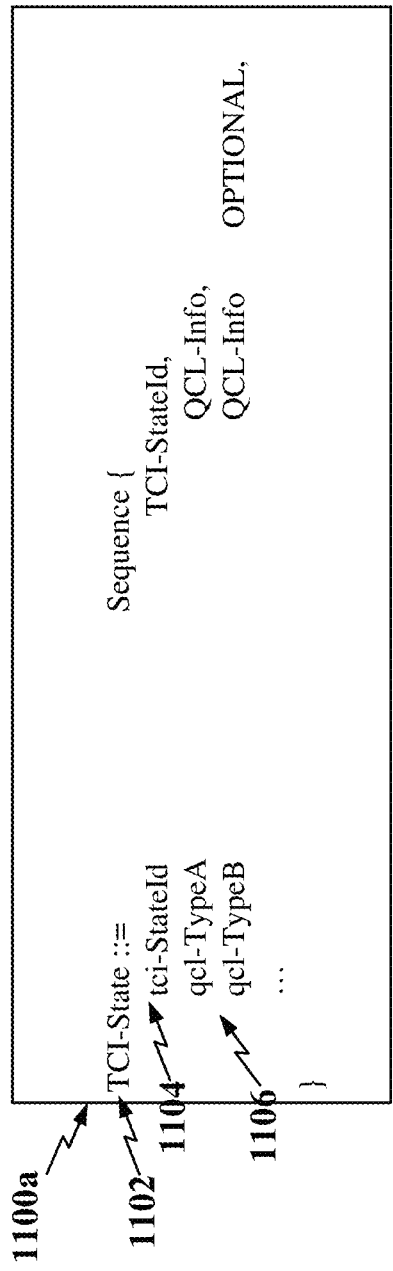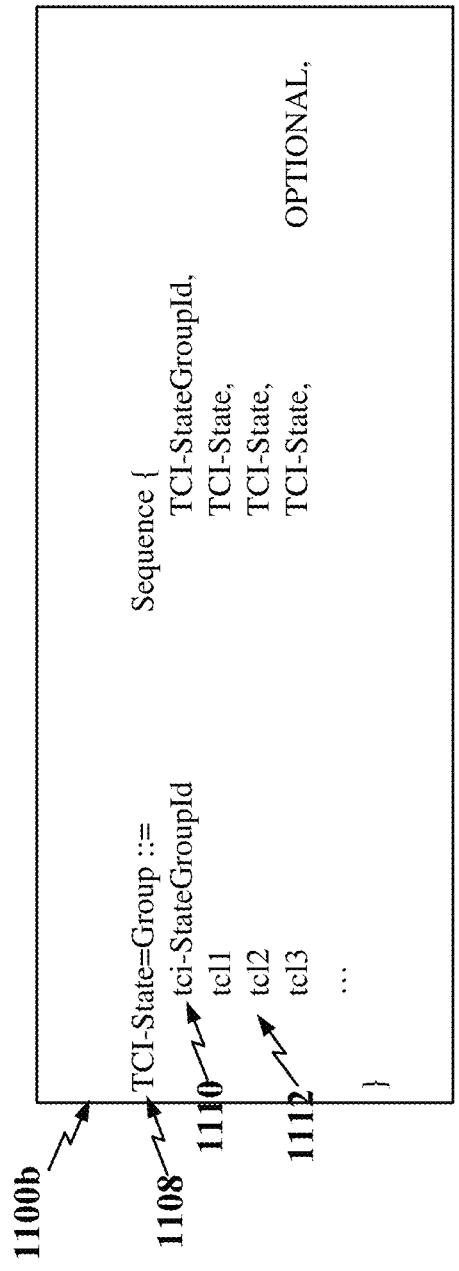
FIG. 11A
FIG. 11B

TRANSMISSION CONFIGURATION INDICATOR (TCI) STATE GROUPS

INTRODUCTION

The technology discussed below relates generally to wireless communication networks, and more particularly, to beam configuration in beam-based communication scenarios.

In wireless communication systems, such as those specified under standards for 5G New Radio (NR), a base station and user equipment (UE) may utilize beamforming for spatial division multiplexing of multiple streams from the base station to the UE. To facilitate beamformed multistream communication, the base station may provide the UE with a set of transmission configuration indicator (TCI) states. Each TCI state may include quasi co-location (QCL) information indicating one or more downlink reference signals from which various radio channel properties of downlink channels or downlink signals may be inferred. An example of QCL information includes QCL-TypeD, which indicates a spatial property of a beam (e.g., a beam direction and/or beam width) associated with a particular downlink reference signal. From the QCL-TypeD information, the UE may infer the beam on which a downlink channel or downlink signal may be communicated.

TCI states may be activated or deactivated for a UE. The base station may then select a particular one of the activated TCI states for communication of a downlink channel or downlink signal to the UE. For multi-stream communication, a different TCI state can be selected for each of the streams, and each TCI state may be associated with a different transmission and reception point (TRP) associated with the base station.

BRIEF SUMMARY

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method for wireless communication at a user equipment (UE) in a wireless communication network is disclosed. The method can include obtaining a respective beam quality metric for each transmit beam of a plurality of transmit beams and transmitting, to a radio access network (RAN) entity, a beam report indicating a plurality of beam groups based on the respective beam quality metrics. Each of the plurality of beam groups can include two or more of the plurality of transmit beams. The method can further include receiving, from the RAN entity, a plurality of transmission configuration indicator (TCI) state groups, each of the plurality of TCI state groups corresponding to a respective one of the plurality of beam groups.

Another example provides a UE configured for wireless communication including a memory and a processor coupled to the memory. The processor and the memory can be configured to obtain a respective beam quality metric for each transmit beam of a plurality of transmit beams and transmit, to a radio access network (RAN) entity, a beam report indicating a plurality of beam groups based on the respective beam quality metrics. Each of the plurality of beam groups can include two or more of the plurality of transmit beams. The processor and the memory can further be configured to receive, from the RAN entity, a plurality of transmission configuration indicator (TCI) state groups, each of the plurality of TCI state groups corresponding to a respective one of the plurality of beam groups.

Another example provides a UE configured for wireless communication. The UE includes means for obtaining a respective beam quality metric for each transmit beam of a plurality of transmit beams and means for transmitting, to a radio access network (RAN) entity, a beam report indicating a plurality of beam groups based on the respective beam quality metrics. Each of the plurality of beam groups can include two or more of the plurality of transmit beams. The UE can further include means for receiving, from the RAN entity, a plurality of transmission configuration indicator (TCI) state groups, each of the plurality of TCI state groups corresponding to a respective one of the plurality of beam groups.

Another example provides a non-transitory computer-readable medium storing processor-executable code for causing a processor of a UE to obtain a respective beam quality metric for each transmit beam of a plurality of transmit beams and transmit, to a radio access network (RAN) entity, a beam report indicating a plurality of beam groups based on the respective beam quality metrics. Each of the plurality of beam groups can include two or more of the plurality of transmit beams. The non-transitory computer-readable medium can further include processor-executable code for causing the processor of the UE to receive, from the RAN entity, a plurality of transmission configuration indicator (TCI) state groups, each of the plurality of TCI state groups corresponding to a respective one of the plurality of beam groups.

In another example, a method for wireless communication at a radio access network (RAN) entity in a wireless communication network is disclosed. The method can include receiving, from a user equipment (UE) in wireless communication with the RAN entity, a beam report indicating a plurality of beam groups, each including two or more of a plurality of transmit beams associated with the RAN entity. The method can further include grouping the plurality of transmit beams into the plurality of beam groups based on the beam report. The method can further include transmitting, to the UE, a plurality of transmission configuration indicator (TCI) state groups, each of the plurality of TCI state groups corresponding to a respective one of the plurality of beam groups.

Another example provides a RAN entity configured for wireless communication including a memory and a processor coupled to the memory. The processor and the memory can be configured to receive, from a user equipment (UE) in wireless communication with the RAN entity, a beam report indicating a plurality of beam groups, each including two or more of a plurality of transmit beams associated with the RAN entity. The processor and the memory can further be configured to group the plurality of transmit beams into the plurality of beam groups based on the beam report. The processor and the memory can further be configured to transmit, to the UE, a plurality of transmission configuration indicator (TCI) state groups, each of the plurality of TCI state groups corresponding to a respective one of the plurality of beam groups.

Another example provides a RAN entity configured for wireless communication. The RAN entity can include means for receiving, from a user equipment (UE) in wireless communication with the RAN entity, a beam report indicating a plurality of beam groups, each including two or more of a plurality of transmit beams associated with the RAN entity. The RAN entity can further include means for grouping the plurality of transmit beams into the plurality of beam groups based on the beam report. The RAN entity can further include means for transmitting, to the UE, a plurality of transmission configuration indicator (TCI) state groups, each of the plurality of TCI state groups corresponding to a respective one of the plurality of beam groups.

Another example provides a non-transitory computer-readable medium storing processor-executable code for causing a processor of a RAN entity to receive, from a user equipment (UE) in wireless communication with the RAN entity, a beam report indicating a plurality of beam groups, each including two or more of a plurality of transmit beams associated with the RAN entity. The non-transitory computer-readable medium can further include processor-executable code for causing the processor of the RAN entity to group the plurality of transmit beams into the plurality of beam groups based on the beam report. The non-transitory computer-readable medium can further include processor-executable code for causing the processor of the RAN entity to transmit, to the UE, a plurality of transmission configuration indicator (TCI) state groups, each of the plurality of TCI state groups corresponding to a respective one of the plurality of beam groups.

These and other aspects will become more fully understood upon a review of the detailed description, which follows. Other aspects, features, and examples will become apparent to those of ordinary skill in the art, upon reviewing the following description of specific, exemplary aspects of in conjunction with the accompanying figures. While features may be discussed relative to certain aspects and figures below, all aspects can include one or more of the advantageous features discussed herein. In other words, while one or more aspects may be discussed as having certain advantageous features, one or more of such features may also be used in accordance with the various aspects discussed herein. In similar fashion, while exemplary aspects may be discussed below as device, system, or method aspects, such exemplary aspects can be implemented in various devices, systems, and methods.

BRIEF DESCRIPTION OF THE DRAWINGS

FIGS. 11A and 11B are diagrams illustrating examples of radio resource control (RRC) TCI state tables according to some aspects.

DETAILED DESCRIPTION

Figure 1:
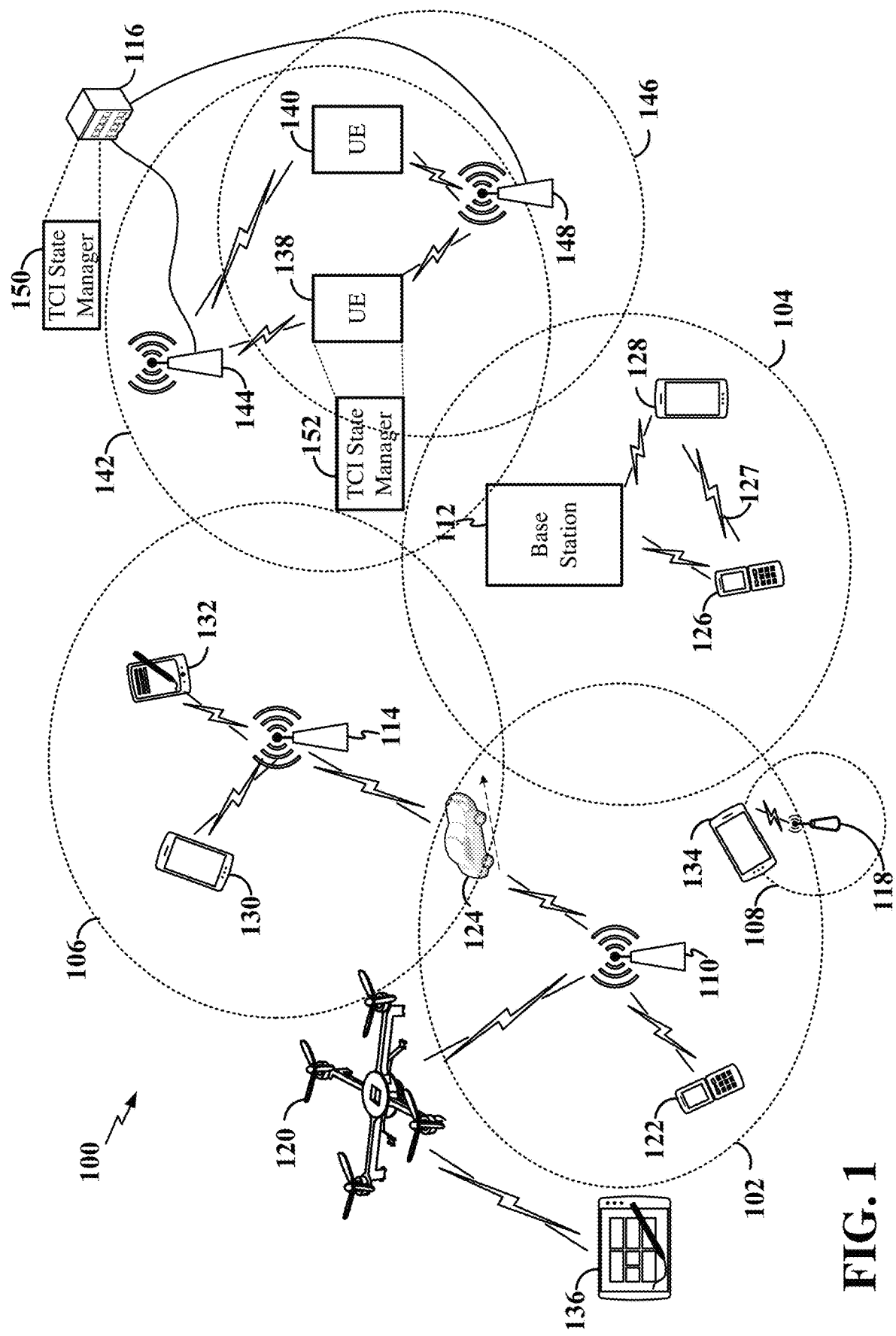
FIG. 1 is a conceptual illustration of an example of a radio access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Various aspects of the disclosure relate to transmission configuration indicator (TCI) state configuration in multi-stream communication between a radio access network (RAN) entity and a user equipment (UE). The RAN entity may transmit a plurality of transmit beams in a mmWave frequency band (e.g., FR2, FR4, FR4-a, FR4-1, FR5 or other frequency band utilizing spatially directional beams), each carrying a respective beam reference signal (e.g., a synchronization signal block (SSB) or channel state information-reference signal (CSI-RS)) to the UE. The UE may obtain a respective beam quality metric (e.g., reference signal received power (RSRP), signal-to-interference-plus-noise ratio (SINR), etc.) for each of the transmit beams. The UE may then generate and transmit a beam report including the beam quality metrics for each of the transmit beams to the RAN entity. Based on the beam report, the RAN entity may group the transmit beams into beam groups and transmit a respective TCI state group for each of the beam groups to the UE.

In some examples, the RAN entity may transmit a radio resource control (RRC) configuration of the TCI state groups to the UE. For example, the RAN entity may configure an RRC TCI state group table for the UE based on the beam report and transmit the RRC TCI state group table to the UE. The RAN entity may then transmit an activation message, such as a medium access control-control element (MAC-CE), activating a set of active TCI state groups. In some examples, the set of active TCI state groups may include up to eight of the TCI state groups. To facilitate multi-stream communication of a physical downlink shared channel (PDSCH), the RAN entity may then transmit control information (e.g., downlink control information (DCI)) to the UE that includes an active TCI state group of the set of active TCI state groups associated with an assignment of resources for spatial division multiplexing (SDM) of a plurality of streams to the UE. In some examples, the control information may include three bits indicating the active TCI state group.

For example, each of the transmit beams associated with the RAN entity may correspond to a respective transmission and reception point (TRP) associated with the RAN entity. In this example, each of the streams in the multi-stream communication may be transmitted from a different one of the TRPs using an active beam group associated with the active TCI state group.

In some examples, the UE may further obtain a respective initial beam quality metric for each of the transmit beams and transmit an initial beam report including the respective initial beam quality metrics to the RAN entity. The RAN entity may then configure an RRC TCI states table for the UE based on the initial beam report and transmit to the UE a plurality of TCI states, each associated with a respective one of the plurality of transmit beams. For example, the RAN entity may transmit an RRC configuration of the plurality of TCI states (e.g., the RRC TCI states table) to the UE. Each of the plurality of TCI state groups may include the respective TCI states of each of the transmit beams within the respective beam group.

In some examples, for each transmit beam, the UE may obtain a respective individual beam quality metric on each receive beam of the UE during a measurement period to produce a respective beam quality metric vector. In some examples, the beam report may then include the beam quality metric vectors. In some examples, the beam report may include recommended beam groups. Here, the UE may utilize the beam quality metric vectors to identify the recommended beam groups and the RAN entity may group the transmit beams into the beam groups based on the recommended beam groups.

In some examples, for each transmit beam, the UE may measure each of the receive beams in parallel (e.g., at the same time) during the measurement period. For example, the UE may utilize a Butler matrix to perform the parallel measurements. In other examples, for each transmit beam, the UE may measure the respective beam quality metric on each of the receive beams serially (e.g., on one receive beam at a time) during the measurement period. Here, the serial measurements on each of the receive beams may be conducted on respective repetitions of the transmit beam, such that one measurement is obtained on each receive beam at a time using one of the repetitions of the transmit beam. In other examples, for each transmit beam, the UE may measure the respective beam quality metric on each of the receive beams in parallel for each of a plurality repetitions of the transmit beam during the measurement period to double the vector length.

In some examples, each of the beam report and the initial beam report are Layer 1 (L1) beam measurement reports in which the measurements are both performed at the physical layer (L1) and reported at the physical layer (L1). In some examples, the beam quality metric includes a reference signal received power (RSRP). In this example, the beam quality metric vectors can include RSRP vectors. In some examples, the RSRP vectors can indicate an inter-beam interference (or mutual interference) between the plurality of transmit beams. In this example, the beam groups may each include at least two beam pair links (e.g., pairs of transmit beams and corresponding receive beams) that may have a minimum mutual interference therebetween.

While aspects and features are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, aspects and/or uses may come about via integrated chip devices and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described aspects may occur. Implementations may range in spectrum from chip-level or modular components to non-modular, non-chip-level implementations and further to aggregate, distributed, or OEM devices or systems incorporating one or more aspects of the described aspects. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to 3rd Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, 106, 142, and 146, and a small cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element or entity in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology.

In FIG. 1, three base stations 110, 112, and 114 are shown in cells 102, 104, and 106, respectively; and a fourth base station 116 is shown controlling remote radio heads (RRHs) 144 and 148 in cells 142 and 146. That is, a base station can have an integrated antenna or can be connected to an antenna or RRH by feeder cables. In the illustrated example, the cells 102, 104, 106, 142, and 146 may be referred to as macrocells, as the base stations 110, 112, 114, and 116 support cells having a large size. Further, a base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 116, and 118 provide wireless access points to a core network for any number of mobile apparatuses.

FIG. 1 further includes an unmanned aerial vehicle (UAV) 120, such as a quadcopter or drone, which may be configured to function as a base station. That is, in some examples, a cell may not necessarily be stationary, and the geographic area of the cell may move according to the location of a mobile base station such as the UAV 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114; UE 134 may be in communication with base station 118; UEs 138 and 140 may be in communication with base station 116 via one or more of the RRHs 144 and 148; and UE 136 may be in communication with mobile base station 120. Here, each base station 110, 112, 114, 116, 118, and 120 may be configured to provide an access point to a core network (not shown) for all the UEs in the respective cells. In another example, a mobile network node (e.g., UAV 120) may be configured to function as a UE. For example, the UAV 120 may operate within cell 102 by communicating with base station 110.

In some examples, access to the air interface may be scheduled, wherein a scheduling entity (e.g., a base station 112) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs (e.g., UE 126), which may be scheduled entities, may utilize resources allocated by the scheduling entity 112.

Base stations are not the only entities that may function as scheduling entities. That is, in some examples, a UE may function as a scheduling entity, scheduling resources for one or more scheduled entities (e.g., one or more other UEs). And as discussed more below, UEs may communicate directly with other UEs in peer-to-peer (P2P) fashion and/or in relay configuration.

In a further aspect of the RAN 100, sidelink signals may be used between UEs without necessarily relying on scheduling or control information from a base station. For example, two or more UEs (e.g., UEs 126 and 128) may communicate with each other using peer to peer (P2P) or sidelink signals 127 without relaying that communication through a base station (e.g., base station 112). In some examples, the sidelink signals 127 include sidelink traffic and sidelink control. In some examples, the UEs 126 and 128 may each function as a scheduling entity and/or scheduled entity in which resources may be autonomously selected by the scheduling entity or initiating (e.g., transmitting) sidelink device for sidelink communication with the scheduled entity or receiving sidelink device. In other examples, the base station 112 may allocate resources to the UEs 126 and 128 for the sidelink communication. For example, the UEs 126 and 128 may function as scheduling entities or scheduled entities in a P2P network, a device-to-device (D2D), vehicle-to-vehicle (V2V) network, a vehicle-to-everything (V2X), a mesh network, or other suitable network.

In the RAN 100, the ability for a UE to communicate while moving, independent of their location, is referred to as mobility. The various physical channels between the UE and the RAN are generally set up, maintained, and released under the control of an access and mobility management function (AMF), which may include a security context management function (SCMF) that manages the security context for both the control plane and the user plane functionality and a security anchor function (SEAF) that performs authentication. In some examples, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or data (e.g., user data traffic or other type of traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, a UE (e.g., UE 138) may be in the coverage area of more than one cell (e.g., cells 142 and 146). In this example, each RRH 144 and 148 serving one of the cells 142 and 146 may function as a transmission and reception point (TRP) in a multi-TRP network configuration in which downlink and/or uplink signals may be transmitted between the UE 138 and each of the TRPs 144 and 148. In some examples, the TRPs 144 and 148 may be configured using a centralized RAN architecture in which base station 116 operates to coordinate transmissions and receptions between the UE 138 and TRPs 144 and 148. For example, the base station 116 and UE 138 may be configured for multi-stream communication, in which two streams of downlink data may be simultaneously transmitted to the UE 138 from each of the TRPs 144 and 148 to reduce interference, increase the data rate, and/or increase the received power. As another example, downlink signals may be transmitted from one TRP (e.g., TRP 144) and uplink signals may be received at another TRP (e.g., TRP 148).

In addition, beamformed signals may be utilized between the UE 138 and each of the TRPs 144 and 148 communicating, for example, over a mmWave carrier, such as FR2, FR4-a, FR4-1, FR4, or FR5. To facilitate beamformed multi-stream communication, the base station 116 may select a respective beam pair link (BPL) between the UE 138 and each of the TRPs 144 and 148 for spatial division multiplexing (SDM) of a respective stream on each of the BPLs. Each selected BPL may be associated with a respective transmission configuration indicator (TCI) state that indicates quasi co-location (QCL) information (e.g., QCL-Types) between a downlink reference signal, such as a synchronization signal block (SSB) or channel state information-reference signal (CSI-RS), and a downlink signal or downlink channel (e.g., a physical downlink shared channel) communicated on the selected BPL.

An example of QCL information includes QCL-TypeD, which indicates a spatial property of a beam (e.g., a beam direction and/or beam width) associated with a particular downlink reference signal. By indicating the QCL-TypeD information for a PDSCH transmission, the base station 116 may inform the UE 138 that the PDSCH transmission uses the same downlink (transmit) beam as a configured reference signal. In simple terms, it may be said that a TCI state can include a beam indication that explicitly identifies which downlink beam is being used by the base station 116.

For multi-stream PDSCH communications, the base station 116 indicates the respective TCI state (e.g., respective beam) for each stream. The selected TCI states for a multi-stream PDSCH communication may be transmitted from the base station 116 to the UE 138 within, for example, control information (e.g., downlink control information (DCI)) that further carries the resource assignment (e.g., time-frequency resources) for the multi-stream PDSCH communication. For example, the selected TCI state for a particular stream may be signaled using three bits in the DCI. However, since the control information includes a separate selected TCI state for each stream, the signaling overhead increases linearly with the number of streams.

Therefore, in various aspects of the disclosure, the base station 116 and UE 138 may each include a respective TCI state manager 150 and 152 to enable TCI state groups to be configured on the base station 116 and UE 138. Each TCI state group includes a plurality of (e.g., two or more) TCI states, each indicating a respective transmit (downlink) beam on which a corresponding stream of a multi-stream PDSCH communication is transmitted. In some examples, the TCI state manager 150 on the base station 116 may group various transmit beams of the TRPs 144 and 148 into a plurality of beam groups. Each beam group may include a single transmit beam from each of the TRPs 144 and 148 for multi-stream communication. The TCI state manager 150 on the base station 116 may then configure a plurality of TCI state groups for the UE 138, each corresponding to a different respective beam group, and transmit the TCI state groups to the UE 138. The TCI state groups may be configured, for example, based on a beam report received from the UE 138. For example, the UE 138 may obtain a respective beam quality metric for each transmit beam from each TRP 114 and 148 and transmit the beam report indicating the beam groups based on the respective beam quality metrics.

In some examples, the TCI state manager 150 on the base station 116 may transmit a radio resource control (RRC) configuration of the plurality of TCI state groups (e.g., an RRC TCI state groups table) to the UE 138. The RRC TCI state groups table may include a respective TCI state group identifier and a list of the TCI states included within the respective TCI state group for each of the TCI state groups. The TCI state manager 152 on the UE 138 may then store the RRC TCI state groups table for use in receiving a subsequent multi-stream communication. In some examples, the TCI state manager 150 on the base station 116 may further transmit an activation message (e.g., a MAC-CE) to the UE that activates a set of active TCI state groups of the plurality of TCI state groups. The TCI state manager 152 on the UE 138 may further store the set of active TCI state groups. For a multi-stream PDSCH communication, the TCI state manager 150 on the base station 116 may then select one of the active TCI state groups for transmission of the multi-stream PDSCH communication and include the selected active TCI state group in the control information (e.g., DCI) scheduling the multi-stream PDSCH communication.

Various aspects of the present disclosure will be described with reference to an OFDM waveform, schematically illustrated in FIG. 2. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 2:
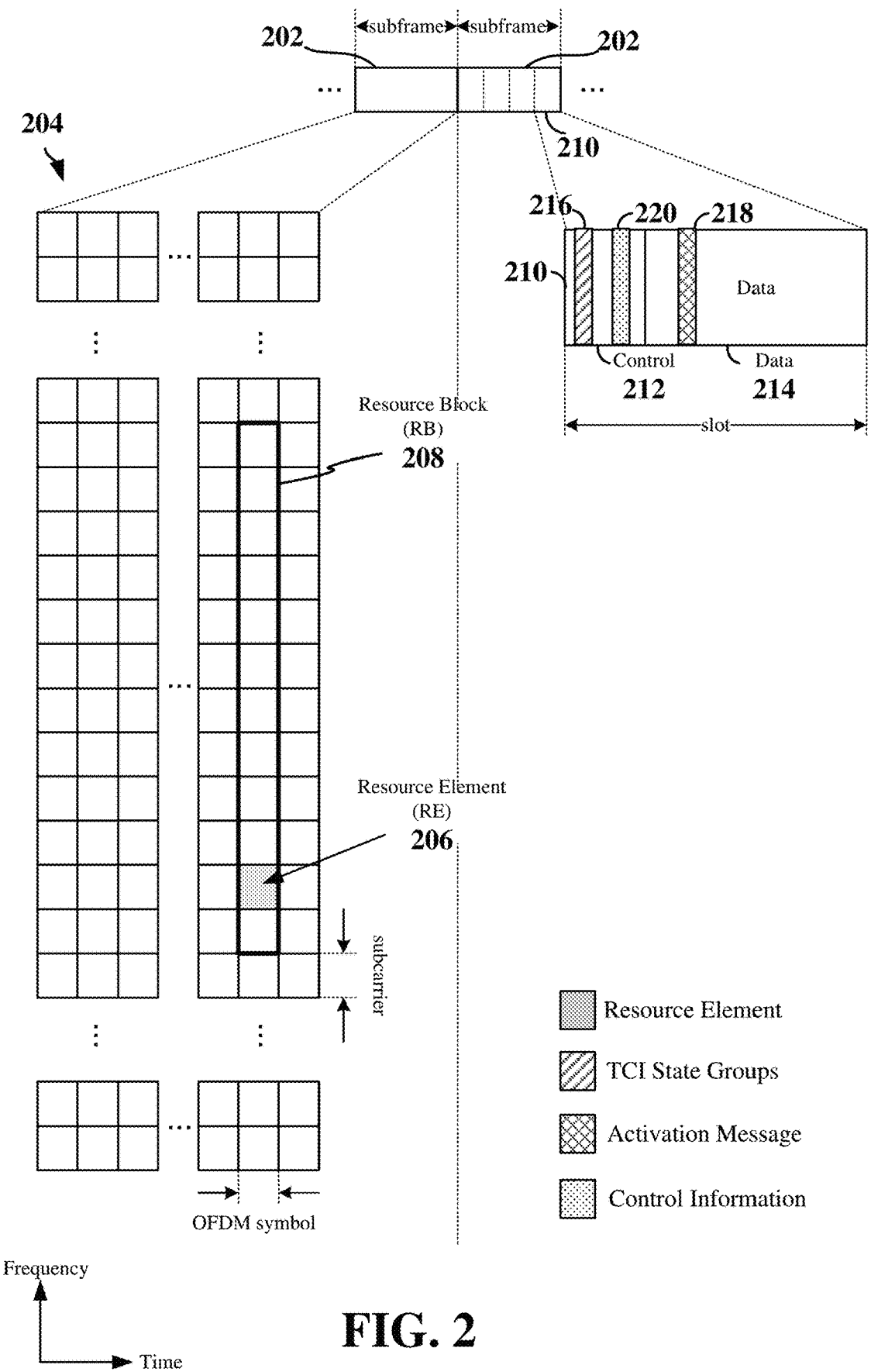
FIG. 2 is a diagram illustrating an example of a frame structure for use in a radio access network according to some aspects.

Referring now to FIG. 2, an expanded view of an exemplary DL subframe 202 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 204 may be used to schematically represent time-frequency resources for a given antenna port. That is, in a multiple-input-multiple-output (MIMO) implementation with multiple antenna ports available, a corresponding multiple number of resource grids 204 may be available for communication. The resource grid 204 is divided into multiple resource elements (REs) 206. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or a resource block (RB) 208, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 208 entirely corresponds to a single direction of communication (either transmission or reception for a given device).

Scheduling of UEs or sidelink devices (hereinafter collectively referred to as UEs) for downlink, uplink, or sidelink transmissions typically involves scheduling one or more resource elements 206 within one or more sub-bands or bandwidth parts (BWPs). Thus, a UE generally utilizes only a subset of the resource grid 204. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 208 is shown as occupying less than the entire bandwidth of the subframe 202, with some subcarriers illustrated above and below the RB 208. In a given implementation, the subframe 202 may have a bandwidth corresponding to any number of one or more RBs 208. Further, in this illustration, the RB 208 is shown as occupying less than the entire duration of the subframe 202, although this is merely one possible example.

Each 1 ms subframe 202 may consist of one or multiple adjacent slots. In the example shown in FIG. 2, one subframe 202 includes four slots 210, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 210 illustrates the slot 210 including a control region 212 and a data region 214. In general, the control region 212 may carry control channels, and the data region 214 may carry data channels. In the example shown in FIG. 2, the control region 212 may include downlink control information and the data region 214 may include downlink data channels or uplink data channels. Of course, a slot may contain all DL, all UL, or at least one DL portion and at least one UL portion. The structure illustrated in FIG. 2 is merely exemplary in nature, and different slot structures may be utilized, and may include one or more of each of the control region(s) and data region(s).

Although not illustrated in FIG. 2, the various REs 206 within an RB 208 may be scheduled to carry one or more physical channels, including control channels, shared channels, data channels, etc. Other REs 206 within the RB 208 may also carry pilots or reference signals. These pilots or reference signals may provide for a receiving device to perform channel estimation of the corresponding channel, which may enable coherent demodulation/detection of the control and/or data channels within the RB 208.

In some examples, the slot 210 may be utilized for broadcast or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 206 (e.g., within the control region 212) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 206 (e.g., in the control region 212 or the data region 214) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

In an UL transmission, the scheduled entity (e.g., UE) may utilize one or more REs 206 (e.g., within the control region 212, which may be at the end of the slot 210) to carry UL control information (UCI) including one or more UL control channels, such as a physical uplink control channel (PUCCH), to the scheduling entity. UCI may include a variety of packet types and categories. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI. The scheduled entity (e.g., UE) may further utilize one or more REs 206 (e.g., within the control region 212 and/or the data region 214) to transmit pilots, reference signals, and other information configured to enable or assist in decoding uplink data transmissions and/or in uplink beam management, such as one or more DMRSs and sounding reference signals (SRSs).

In addition to control information, one or more REs 206 (e.g., within the data region 214) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 206 within the data region 214 may be configured to carry other signals, such as one or more SIBs and DMRSs.

In an example of sidelink communication over a sidelink carrier via a PC5 interface, the control region 212 of the slot 210 may include a physical sidelink control channel (PSCCH) including sidelink control information (SCI) transmitted by an initiating (transmitting) sidelink device (e.g., V2X or other sidelink device) towards a set of one or more other receiving sidelink devices. The data region 214 of the slot 210 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 206 within slot 210. For example, HARQ feedback information may be transmitted in a physical sidelink feedback channel (PSFCH) within the slot 210 from the receiving sidelink device to the transmitting sidelink device. In addition, one or more reference signals, such as a sidelink SSB and/or a sidelink CSI-RS, may be transmitted within the slot 210.

For beamforming, one or more beam reference signals (e.g., SSBs and/or CSI-RSs) may be utilized with beam sweeping for beam selection and beam refinement. For example, a base station may beam sweep a set of SSBs forming a SSB burst (e.g., a set of SSBs transmitted in a 5 ms window) for wide beam selection. Each SSB may be transmitted in four symbols across 240 subcarriers in a slot. As another example, a base station may beam sweep a set of CSI-RSs for narrow beam refinement. Depending on the configured number of ports at the base station, a CSI-RS resource may start at any symbol of a slot and may occupy, for example, one, two or four symbols. In some examples, the narrow CSI-RS beams may be sub-beams of one or more previously selected wider SSB beams. A UE may obtain a beam quality metric (e.g., reference signal received power (RSRP) or signal-to-interference-plus-noise (SINR) of each of the SSB or CSI-RS beams and transmit a beam report (e.g., an L1 beam measurement report) to the base station including the beam quality metric of one or more of the SSB or CSI-RS beams.

In various aspects, multi-stream beamformed communication may be facilitated using TCI state groups. For example, a base station may transmit a plurality of TCI state groups 216 to a UE. Each TCI state group may include a plurality of (e.g., two or more) TCI states, each indicating a respective transmit (downlink) beam on which a corresponding stream of a multi-stream PDSCH communication may be transmitted from the base station to the UE. In some examples, the base station may transmit an RRC configuration of the plurality of TCI state groups (e.g., within the control region 212) to the UE. The base station may further transmit an activation message 218 (e.g., a MAC-CE within the data region 214) to the UE that activates a set of active TCI state groups. The base station may further select one of the active TCI state groups for transmission of a multi-stream PDSCH communication and include the selected active TCI state group in control information 220 (e.g., DCI) scheduling the multi-stream PDSCH communication.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above in connection with FIGS. 1 and 2 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 3:
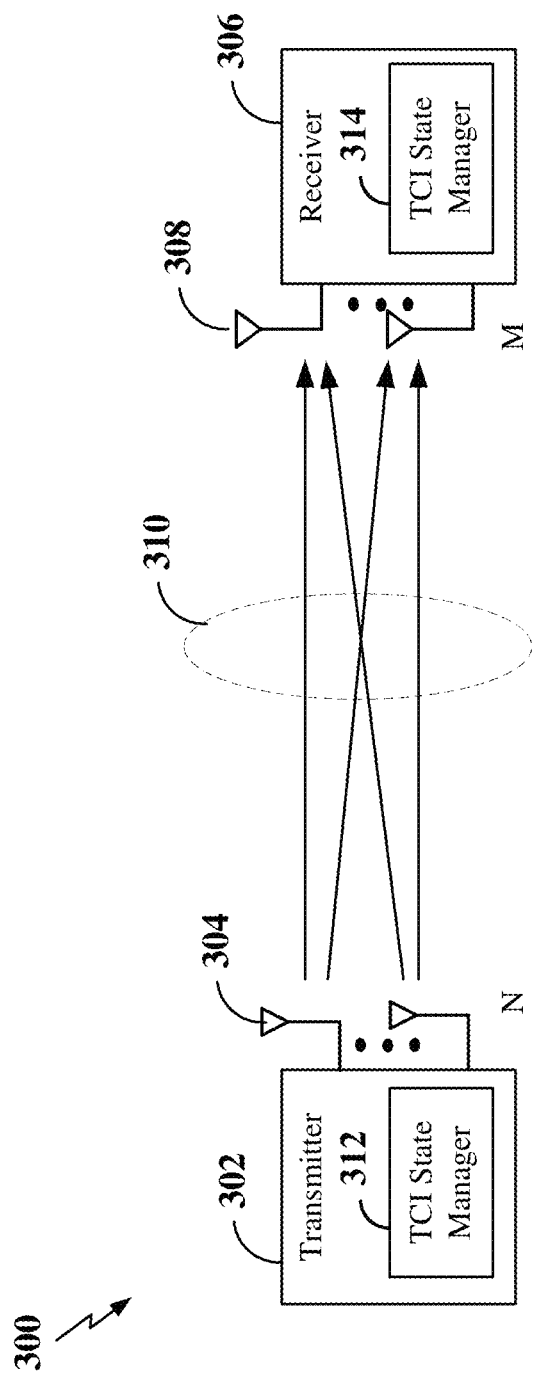
FIG. 3 is a block diagram illustrating a wireless communication system supporting beamforming and/or multiple-input multiple-output (MIMO) communication according to some aspects.

FIG. 3 illustrates an example of a wireless communication system 300 supporting beamforming and/or MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity, a scheduled entity, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

Beamforming is a signal processing technique that may be used at the transmitter 302 or receiver 306 to shape or steer an antenna beam (e.g., a transmit beam or receive beam) along a spatial path between the transmitter 302 and the receiver 306. Beamforming may be achieved by combining the signals communicated via antennas 304 or 308 (e.g., antenna elements of an antenna array module) such that some of the signals experience constructive interference while others experience destructive interference. To create the desired constructive/destructive interference, the transmitter 302 or receiver 306 may apply amplitude and/or phase offsets to signals transmitted or received from each of the antennas 304 or 308 associated with the transmitter 302 or receiver 306.

In 5G New Radio (NR) systems, particularly for mmWave systems, beamformed signals may be utilized for most downlink channels, including the physical downlink control channel (PDCCH) and physical downlink shared channel (PDSCH). In addition, broadcast information, such as the SSB, CSI-RS, slot format indicator (SFI), and paging information, may be transmitted in a beam-sweeping manner to enable all scheduled entities (UEs) in the coverage area of a transmission and reception point (TRP) (e.g., a gNB) to receive the broadcast information. In addition, for UEs configured with beamforming antenna arrays, beamformed signals may also be utilized for uplink channels, including the physical uplink control channel (PUCCH) and physical uplink shared channel (PUSCH).

To facilitate multi-stream communication using SDM, the transmitter 302 and receiver 306 may include a respective TCI state manager 312 and 314 configured to enable configuration of TCI state groups for multi-stream communication between the receiver 306 and the transmitter 302 and between the receiver 306 and at least one additional transmitter (not shown). Here, the receiver 306 may correspond to a UE or other scheduled entity and the transmitter 302 may correspond to a base station or other scheduling entity coordinating communication among multiple TRPs. For example, the TCI state manager 312 of the transmitter 302 may be configured to configure a plurality of TCI state groups for the receiver 304 and to transmit the plurality of TCI state groups to the receiver 304. For example, the TCI state manager 312 may be configured to transmit an RRC configuration of the plurality of TCI state groups (e.g., an RRC TCI state groups table) to the receiver 304. The RRC TCI state groups table may include a respective TCI state group identifier for each of the TCI state groups, along with a list of the respective TCI states included within each TCI state group. The TCI state manager 314 of the receiver 304 may then store the plurality of TCI state groups received from the transmitter 302.

In some examples, the TCI state manager 312 of the transmitter 302 may further be configured to transmit an activation message (e.g., a MAC-CE) to the receiver 304 that activates a set of active TCI state groups of the plurality of TCI state groups. The TCI state manager 314 of the receiver 304 may further store the set of active TCI state groups. For a multi-stream PDSCH communication, the TCI state manager 312 of the transmitter 302 may then select one of the active TCI state groups for transmission of the multi-stream PDSCH communication and transmit control information (e.g., DCI) including the selected active TCI state group for the multi-stream PDSCH communication.

Figure 4:
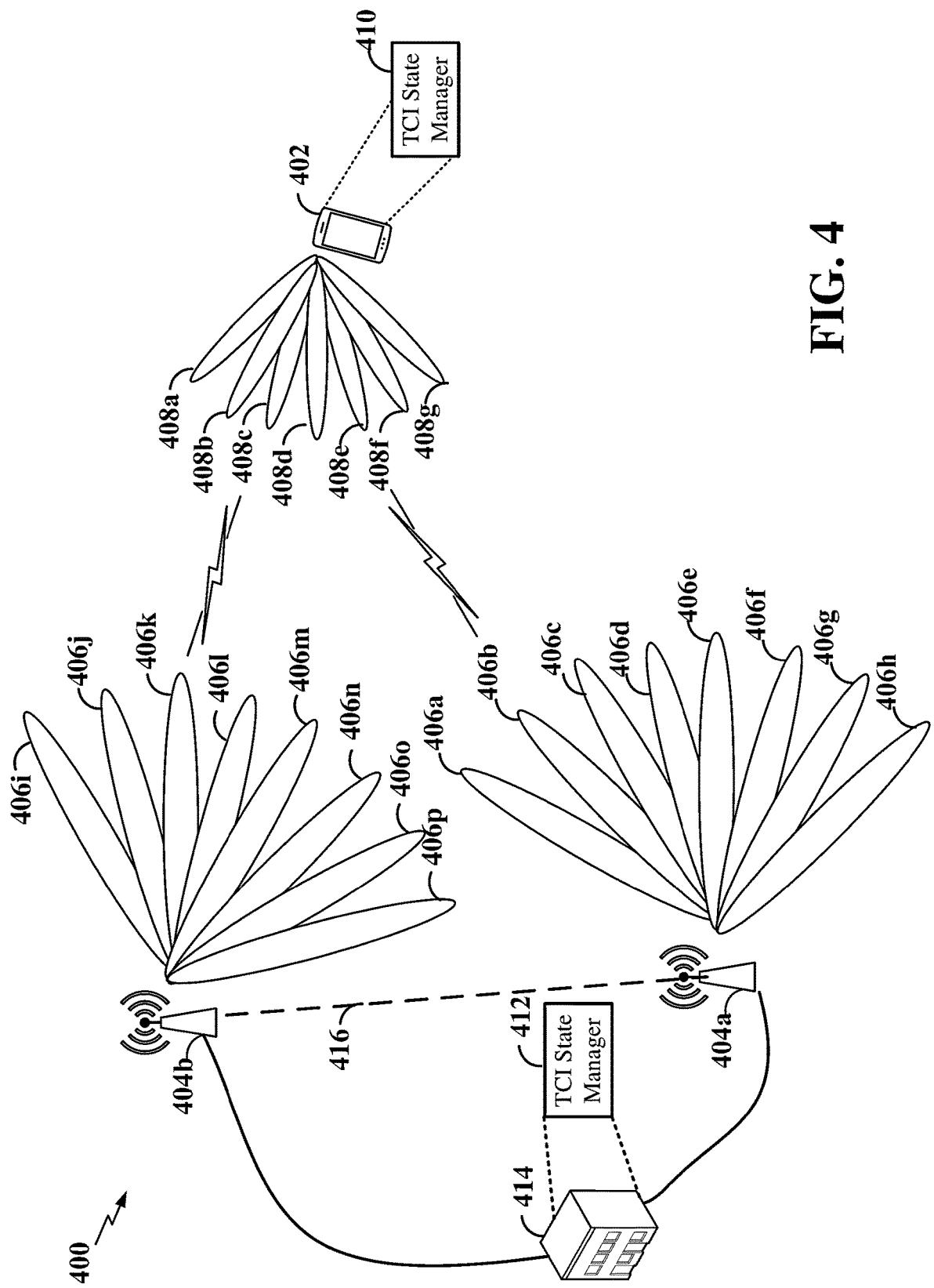
FIG. 4 is a diagram illustrating an example of beamforming in a multi-TRP environment according to some aspects.

FIG. 4 is a diagram illustrating an example of beamforming in a multi-TRP environment 400 according to some aspects. The multi-TRP environment 400 includes a plurality of TRPs 404a and 404b, two of which are illustrated for simplicity. The multi-TRP environment 400 may implement spatial division multiplexing (SDM) in which transmissions (streams) from the multiple TRPs 404a and 404b may be simultaneously directed towards a single UE 402. In such a multi-TRP environment 400 providing multi-stream transmission, the multiple TRPs 404a and 404b may be collocated (e.g., at the same geographical location and coupled to the same antenna tower or pole) and/or non-collocated, the latter being illustrated.

The TRPs 404a and 404b may correspond to macro-cells, small cells, pico cells, femto-cells, remote radio heads, relay nodes, or other radio access network (RAN) nodes. Coordination among the TRPs 404a and 404b for transmission of multiple streams to the UE 402 may be facilitated by a centralized RAN node (e.g., a base station or other centralized RAN node) or via backhaul signaling between the TRPs 404a and 404b. In the example shown in FIG. 4, each of the TRPs 404a and 404b may be remote radio heads (RRHs) of a base station 414 (e.g., gNB). In other examples, each of the TRPs 404a and 404b may be a separate base station and coordination occurs over an optional backhaul link 416. The base station 414 may be any of the base stations or scheduling entities illustrated in FIGS. 1 and/or 3. The UE 402 may be any of the UEs or scheduled entities illustrated in FIGS. 1 and/or 3.

The base station 414 may generally be capable of communicating with the UE 402 using one or more transmit beams on one or more of the TRPs 404a and 404b, and the UE 402 may further be capable of communicating with the base station 414 using one or more receive beams. As used herein, the term transmit beam refers to a beam on one of the TRPs 404a and 404b that may be utilized for downlink or uplink communication with the UE 402. In addition, the term receive beam refers to a beam on the UE 402 that may be utilized for downlink or uplink communication with the base station 414.

In the example shown in FIG. 4, each of the TRPs 404a and 404b is configured to generate a plurality of transmit beams 406a-406h and 406i-406p, respectively, each associated with a different spatial direction. In addition, the UE 402 is configured to generate a plurality of receive beams 408a-408g, each associated with a different spatial direction. In some examples, the TRPs 404a and 404b and UE 402 may each transmit more or less beams distributed in all directions (e.g., 360 degrees) and in three-dimensions. In addition, the transmit beams 406a-406p may include beams of varying beam width. For example, each of the TRPs 404a and 404b may transmit certain signals (e.g., SSBs) on wider beams and other signals (e.g., CSI-RSs) on narrower beams. In some examples, the transmit beams 406a-406p on the TRPs 404a and 404b and the receive beams 408a-408g on the UE 402 may be spatially directional mmWave beams (e.g., FR2, FR4-a or FR4-1, FR4, FR5 or other frequency range designation).

The base station 414 and UE 402 may select one or more transmit beams 406a-406h on TRP 404a, one or more transmit beams 406i-406p on TRP 404b, and one or more receive beams 408a-408g on the UE 402 for communication of uplink and downlink signals therebetween using a beam management procedure. In one example, during initial cell acquisition on each of the TRPs 404a and 404b, the UE 402 may perform a respective P1 beam management procedure to scan the plurality of transmit beams 406a-406h and 406i-406p on each of the TRPs 404a and 404b, respectively, on the plurality of receive beams 408a-408g to select a respective beam pair link (BPL) associated with each of the TRPs 404a and 404b for a respective physical random access channel (PRACH) procedure for initial access. For example, the UE 402 may select a first BPL including one of the transmit beams 406a-406h on the TRP 404a and a corresponding one of the receive beams 408a-408g on the UE 402 and a second BPL including one of the transmit beams 406i-406p on the TRP 404b and a corresponding different one of the receive beams 408a-408g on the UE 402.

For example, periodic SSB beam sweeping may be implemented on each of the TRPs 404a and 404b at certain intervals (e.g., based on the SSB periodicity). Thus, each TRP 404a and 404b may be configured to sweep or transmit an SSB on each of a plurality of wider transmit beams 406a-406h and 406i-406p during the respective beam sweeping interval. The UE 402 may measure the reference signal received power (RSRP) of each of the SSB transmit beams on each of the receive beams of the UE and, for each of the TRPs 404a and 404b, select the transmit and receive beams based on the measured RSRP. In an example, the selected receive beam may be the receive beam on which the highest RSRP is measured and the selected transmit beam may have the highest RSRP as measured on the selected receive beam.

After completing the PRACH procedure, the base station 414 and UE 402 may perform a P2 beam management procedure for beam refinement at the base station 414. For example, the base station 414 may be configured to sweep or transmit a CSI-RS on each of a plurality of narrower transmit beams 406a-406h and 406i-406p on each of the TRPs 404a and 404b. Each of the narrower CSI-RS beams may be a sub-beam of the selected SSB transmit beam (e.g., within the spatial direction of the SSB transmit beam). Transmission of the CSI-RS transmit beams may occur periodically (e.g., as configured via radio resource control (RRC) signaling by the gNB), semi-persistently (e.g., as configured via RRC signaling and activated/deactivated via medium access control-control element (MAC-CE) signaling by the gNB), or aperiodically (e.g., as triggered by the gNB via downlink control information (DCI)). The UE 402 is configured to scan the plurality of CSI-RS transmit beams 406a-406h and 406i-406p on one or more receive beams 408a-408g. The UE 402 then performs beam measurements (e.g., RSRP, SINR, etc.) of the received CSI-RSs on the one or more receive beams 408a-408g to determine the respective beam quality of each of the CSI-RS transmit beams 406a-406h and 406i-406p as measured on the one or more receive beams 408a-408g. In some examples, the UE 402 may measure the RSRP of each of the narrower CSI-RS transmit beams 406a-406h and 406i-406p from each of the TRPs 404a and 404b on the corresponding receive beams selected during the P1 procedure.

The UE 402 can then generate and transmit a Layer 1 (L1) measurement report, including the respective beam index (e.g., CSI-RS resource indicator (CRI)) and beam measurement (e.g., RSRP or SINR) of one or more of the CSI-RS transmit beams 406a-406h and 406i-406p on each of the TRPs 404a and 404b on one or more of the receive beams 408a-408g to the base station 414. The base station 414 may then select one or more CSI-RS transmit beams on each of the TRPs 404a and 404b on which to communicate downlink and/or uplink control and/or data with the UE 402. In some examples, the selected CSI-RS transmit beam(s) have the highest RSRP from the L1 measurement report. Transmission of the L1 measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

The UE 402 may further select a corresponding receive beam on the UE 402 for each selected serving CSI-RS transmit beam to form a respective beam pair link (BPL) for each selected serving CSI-RS transmit beam. For example, the UE 402 can utilize the beam measurements obtained during the P2 procedure or perform a P3 beam management procedure to obtain new beam measurements for the selected CSI-RS transmit beams to select the corresponding receive beam for each selected transmit beam. In some examples, the selected receive beam to pair with a particular CSI-RS transmit beam may be the receive beam on which the highest RSRP for the particular CSI-RS transmit beam is measured.

In addition, when the channel is reciprocal, the transmit and receive beams may be selected using an uplink beam management scheme. In an example, the UE 402 may be configured to sweep or transmit on each of a plurality of receive beams 408a-408g. For example, the UE 402 may transmit an SRS on each beam in the different beam directions. In addition, the base station 414 may be configured to receive the uplink beam reference signals on the plurality of transmit beams 406a-406h and 406i-406p. The base station 414 then performs beam measurements (e.g., RSRP, SINR, etc.) of the beam reference signals on each of the transmit beams 406a-406h and 406i-406p to determine the respective beam quality of each of the receive beams 408a-408g as measured on each of the transmit beams 406a-406h and 406i-406p on each of the TRPs 404a and 404b.

The base station 414 may then select one or more transmit beams on each of the TRPs 404a and 404b on which to communicate downlink and/or uplink control and/or data with the UE 402. In some examples, the selected transmit beam(s) have the highest RSRP. The UE 402 may then select a corresponding receive beam for each selected serving transmit beam to form a respective beam pair link (BPL) for each selected serving transmit beam, using, for example, a P3 beam management procedure, as described above.

In one example, a single transmit beam on each TRP 404a and 404b (e.g., beam 406b and 406k) and a single corresponding receive beam (e.g., beam 408e and 408c) on the UE 402 may form respective single BPLs used for communication between the TRPs 404a and 404b and the UE 402 for multi-stream communication. For example, a first stream of a PDSCH may be communicated on a first BPL formed of transmit beam 406b and receive beam 408e and a second stream of a PDSCH may be communicated on a second BPL formed of transmit beam 406k and receive beam 408c.

In some examples, after connecting to the base station 414, the base station 414 may configure the UE 402 to perform SSB and/or CSI-RS beam measurements and provide an L1 measurement report containing beam measurements of SSB and/or CSI-RS transmit beams 406a-406h and 406i-406p. For example, the base station 414 may configure the UE 402 to perform SSB beam measurements and/or CSI-RS beam measurements for beam management, beam failure detection (BRD), beam failure recovery (BFR), cell reselection, beam tracking (e.g., for a mobile UE 402 and/or base station 414), or other beam optimization purpose.

In various aspects, upon receiving a beam report (e.g., an L1 measurement report) during a P2 procedure or other beam management procedure from the UE 402, the base station 414 may configure a plurality of TCI states for the UE 402 and provide the configured TCI states to the UE 402. For example, the UE 402 and the base station 414 may each include a respective TCI state manager 410 and 412 for managing the configured TCI states for the UE 402. Each TCI state may include QCL information (e.g., QCL-TypeD information) between a downlink reference signal, such as an SSB or CSI-RS, and a downlink signal or downlink channel (e.g., a PDSCH) to be communicated from the base station 414 to the UE 402. For example, the QCL-TypeD information may indicate a particular beam on which a PDSCH may be transmitted.

For multi-stream communication, the TCI state managers 410 and 412 may further enable TCI state groups to be configured on the base station 414 and UE 402. Each TCI state group includes a plurality of (e.g., two or more) TCI states, each indicating a respective transmit (downlink) beam on which a corresponding stream of a multi-stream PDSCH communication is transmitted. In some examples, the TCI state manager 412 on the base station 414 may group various transmit beams of the TRPs 404a and 404b into a plurality of beam groups. Each beam group may include a single transmit beam from each of the TRPs 404a and 404b for multi-stream communication. The TCI state manager 412 on the base station 414 may then configure a plurality of TCI state groups for the UE 402, each corresponding to a different respective beam group, and transmit the TCI state groups to the UE 402.

The TCI state groups may be configured, for example, based on a beam report received from the UE 402. The beam report may correspond to the same beam report transmitted during the P2 procedure or other beam management procedure from which the TCI states are initially configured or may be a subsequent beam report transmitted after configuration of the TCI states for the UE 402. For example, the base station 414 may configure the UE 402 to perform SSB and/or CSI-RS beam measurements (e.g., as part of a P2 procedure or other subsequent beam management procedure) and provide an L1 measurement report indicating the beam groups. In this example, the UE 402 may obtain a respective beam quality metric (e.g., RSRP) for each transmit beam 406a-406h and 406i-406p from each TRP 404a and 404b on each receive beam 408a-408g of the UE 402 and transmit the beam report indicating the beam groups based on the respective beam quality metrics.

In some examples, the beam report includes a list of two or more recommended beam groups determined by the UE 402 based on the respective beam quality metrics. In other examples, the beam report includes beam quality metric information from which the base station 414 may determine the beam groups. For example, the beam quality metric information may include a respective beam quality metric vector for each of the transmit beams 406a-406p. Each beam quality metric vector is associated with a single transmit beam and includes a respective RSRP measurement of that transmit beam on each receive beam 408a-408g of the UE 402. From the beam quality metric vectors, the base station 414 may select the beam groups such that each beam group includes a respective BPL associated with each of the TRPs 404a and 404b that have minimal mutual interference (e.g., minimum inter-beam interference) therebetween.

In some examples, the TCI state manager 412 on the base station 414 may transmit a radio resource control (RRC) configuration of the plurality of TCI state groups (e.g., an RRC TCI state groups table) to the UE 402. The RRC TCI state groups table may include a respective TCI state group identifier and a list of the TCI states included within the respective TCI state group for each of the TCI state groups. The TCI state manager 410 on the UE 402 may then store the RRC TCI state groups table for use in receiving a subsequent multi-stream communication. In some examples, the TCI state manager 412 on the base station 414 may further activate/deactivate one or more of the plurality of TCI state groups via a MAC-CE. For example, the TCI state manager 410 may transmit an activation message (e.g., a MAC-CE) to the UE 402 that activates a set of active TCI state groups of the plurality of TCI state groups. In some examples, the set of active TCI state groups includes up to eight active TCI state groups that may be selected from for PDSCH transmissions. The TCI state manager 410 on the UE 402 may further store the set of active TCI state groups. For a multi-stream PDSCH communication, the TCI state manager 412 on the base station 414 may then select one of the active TCI state groups for transmission of the multi-stream PDSCH communication and include the selected active TCI state group in the control information (e.g., DCI) scheduling the multi-stream PDSCH communication.

Figure 5:
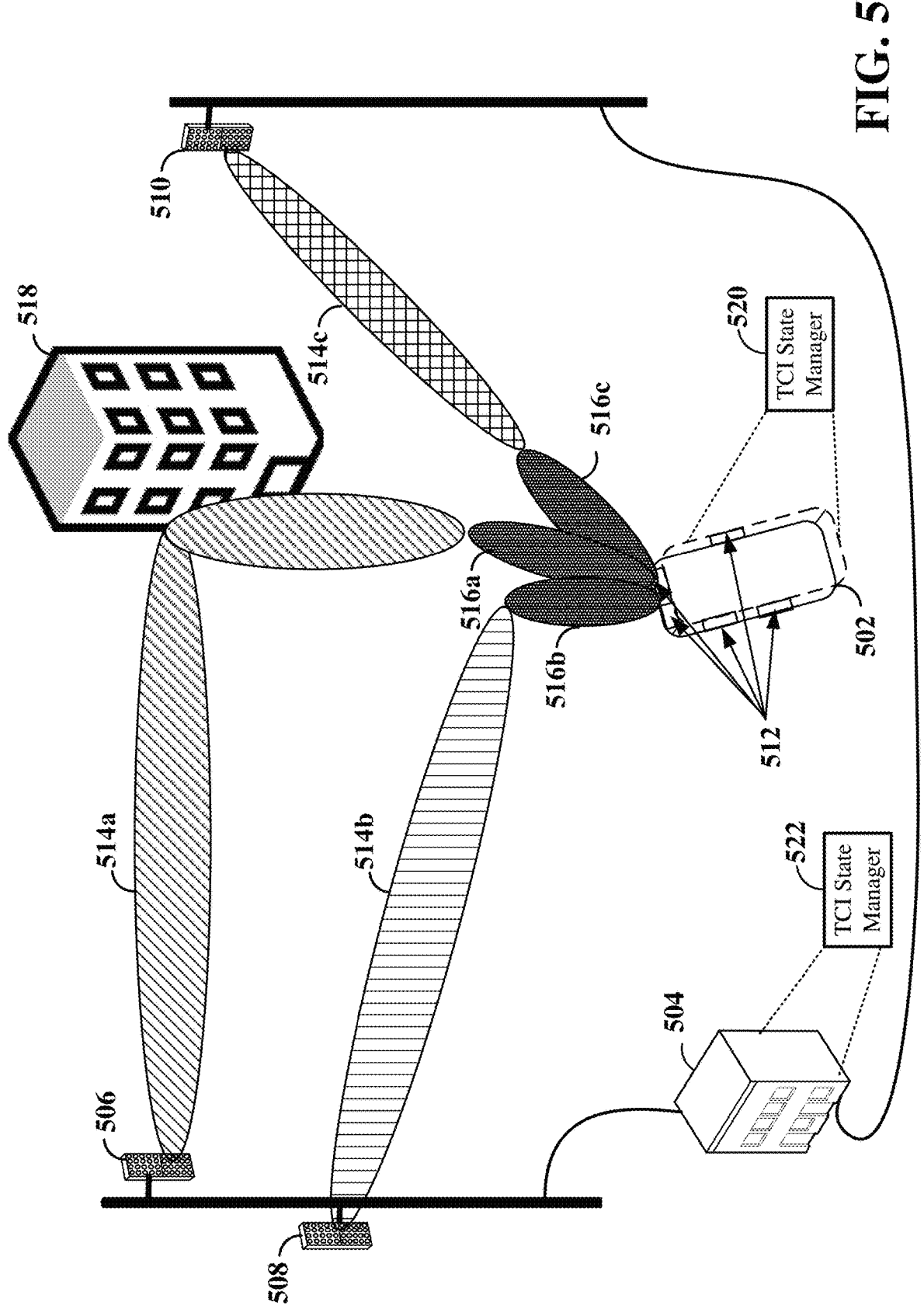
FIG. 5 is a diagram illustrating an example of multi-stream communication according to some aspects.

FIG. 5 is a diagram illustrating an example of multi-stream communication between a UE 502 and a radio access network (RAN) entity 504 according to some aspects. The RAN entity 504 may be any of the base stations (e.g., gNBs) or scheduling entities illustrated in FIGS. 1, and/or 4, and the UE 502 may be any of the UEs or scheduled entities illustrated in FIGS. 1, and/or 4. The RAN entity 504 may be configured to coordinate communication amongst a plurality of TRPs 506, 508, and 510. The TRPs 506, 508, and 510 may be collocated or non-collocated. In the example shown in FIG. 5, TRPs 506 and 508 are collocated, whereas TRP 510 is non-collocated with either of the other TRPs 506 and 508.

The UE 502 may include a single antenna panel 512 or multiple antenna panels, the latter being illustrated in FIG. 5. For example, the antenna panels 512 may be located at various positions on the UE 502 to enable each antenna panel 512 to cover a respective portion of a sphere surrounding the UE 502. Each antenna panel 512 may support a plurality of beams (e.g., receive beams). For mmWave (e.g., FR2 or higher) communication, multiple concurrent beams may be supported by the same antenna panel 512 using, for example, a Butler matrix. For example, the UE 502 may include P antenna panels, each supporting up to B beams. A number of active antenna panels K, where K≤P, can be used at the same time to receive multiple streams S, where S≤K*B. Here, the K*B beams may be referred to as a beam collection (e.g., a collection of beams). The UE 502 may process each beam in the beam collection independently, up to the log likelihood ratio (LLR) level.

The RAN entity 504, acting as a multi-TRP (m-TRP), can be configured to provide S independent streams on S separate beams. In the example shown in FIG. 5, the RAN entity 504 may provide a first stream on a first transmit beam 514a from TRP 506, a second stream on a second transmit beam 514b from TRP 508, and a third stream on a third transmit beam 514c from TRP 510. Each transmit beam 514a, 514b, and 514c may be directed (e.g., via a line-of-sight path or reflection off of one or more objects 518) towards the UE 502 and received via a respective receive beam 516a, 516b, and 516c on the UE 502. Thus, each transmit beam 514a-514c and corresponding receive beam 516a-516c form a respective BPL between the RAN entity 504 and the UE 502. The receive beams 516a-516c may correspond to the same antenna panel 512, as shown in FIG. 5, or different antenna panels. Using the same antenna panel may reduce power consumption at the UE, as only a single antenna panel is turned on.

In various aspects, the RAN entity 504 may select the transmit beams 514a-514c (e.g., downlink serving beams) for SDM of multiple streams of a PDSCH based on TCI state groups configured for the UE 502. For example, the UE 502 and RAN entity 504 may each include a respective TCI state manager 520 and 522 configured to manage TCI states and TCI state groups for the UE 502. The TCI state manager 522 on the RAN entity 504 may configure a plurality of TCI states for the UE 502 based on, for example, a beam report (e.g., an L1 measurement report) and provide the configured TCI states to the UE 502. The TCI state manager 522 on the RAN entity 504 may further configure a plurality of TCI state groups for the UE 502. Each TCI state group includes a plurality of (e.g., two or more) TCI states, each indicating a respective transmit (downlink) beam on which a corresponding stream of a multi-stream PDSCH communication may be transmitted.

In some examples, the TCI state manager 522 on the RAN entity 504 may group various transmit beams of the TRPs 506, 508, and 510 into a plurality of beam groups. Each beam group may include a single transmit beam from each of two or more of the TRPs 506, 508, and 510 for multi-stream communication. The TCI state manager 522 on the RAN entity 504 may then configure a plurality of TCI state groups for the UE 502, each corresponding to a different respective beam group, and transmit the TCI state groups to the UE 502.

The TCI state groups may be configured, for example, based on a beam report received from the UE 502. The beam report may correspond to the same beam report utilized for the initial configuration of the TCI states or may be a subsequent beam report transmitted after configuration of the TCI states for the UE 502. For example, the beam report may be an L1-RSRP report or L1-SINR report (e.g., SSB resource indicator (SRI) or CSI-RS resource indicator (CRI) based beam report). The beam report may include information indicating the plurality of beam groups (e.g., two or more beam groups) that may be selected from for a PDSCH multi-stream communication. Each beam group may include a single transmit beam from each of two or more of the TRPs

506, 508, and 510 that collectively produce a minimum mutual interference (e.g., minimum inter-beam interference) therebetween.

For example, the RAN entity 504 may configure the UE 502 (e.g., via RRC signaling) to obtain multiple parallel or serial beam quality metrics on each of the receive beams (e.g., of each of the panels 512) for each of the transmit beams to generate a respective beam quality metric vector for each of the transmit beams. The UE 502 may then generate and transmit a beam report indicating the beam groups based on the beam quality metric vectors. In some examples, the beam report includes a list of two or more recommended beam groups identified by the UE 502 based on the respective beam quality metric vectors. In other examples, the beam report includes the respective beam quality metric vector for each of the transmit beams. The RAN entity 504 may then be configured to group the transmit beams into the beam groups based on the beam report, such that each beam group includes one transmit beam from each of two or more of the TRPs 506, 508, and 510 for multi-stream communication between the TRPs 506, 508, and 510 and the UE 502. In some examples, for each beam group, the selected transmit beams in that beam group provide a minimal mutual interference (e.g., minimum inter-beam interference) therebetween.

In some examples, the TCI state manager 522 on the RAN entity 504 may transmit a radio resource control (RRC) configuration of the plurality of TCI state groups (e.g., an RRC TCI state groups table) to the UE 502. The RRC TCI state groups table may include a respective TCI state group identifier and a list of the TCI states included within the respective TCI state group for each of the TCI state groups. The TCI state manager 520 on the UE 502 may then store the RRC TCI state groups table for use in receiving a subsequent multi-stream communication. In some examples, the TCI state manager 522 on the RAN entity 504 may further activate/deactivate one or more of the plurality of TCI state groups via a MAC-CE. For example, the TCI state manager 522 may transmit an activation message (e.g., a MAC-CE) to the UE 502 that activates a set of active TCI state groups of the plurality of TCI state groups. In some examples, the set of active TCI state groups includes up to eight active TCI state groups that may be selected from for PDSCH transmissions. The TCI state manager 520 on the UE 502 may further store the set of active TCI state groups. For a multi-stream PDSCH communication, the TCI state manager 522 on the RAN entity 504 may then select one of the active TCI state groups for transmission of the multi-stream PDSCH communication and include the selected active TCI state group in the control information (e.g., DCI) scheduling the multi-stream PDSCH communication. For example, the TCI state manager 522 on the RAN entity 504 may select the TCI state group corresponding to a beam group including transmit beams 514*a* and 514*c* for the multi-stream PDSCH communication.

Figure 6:
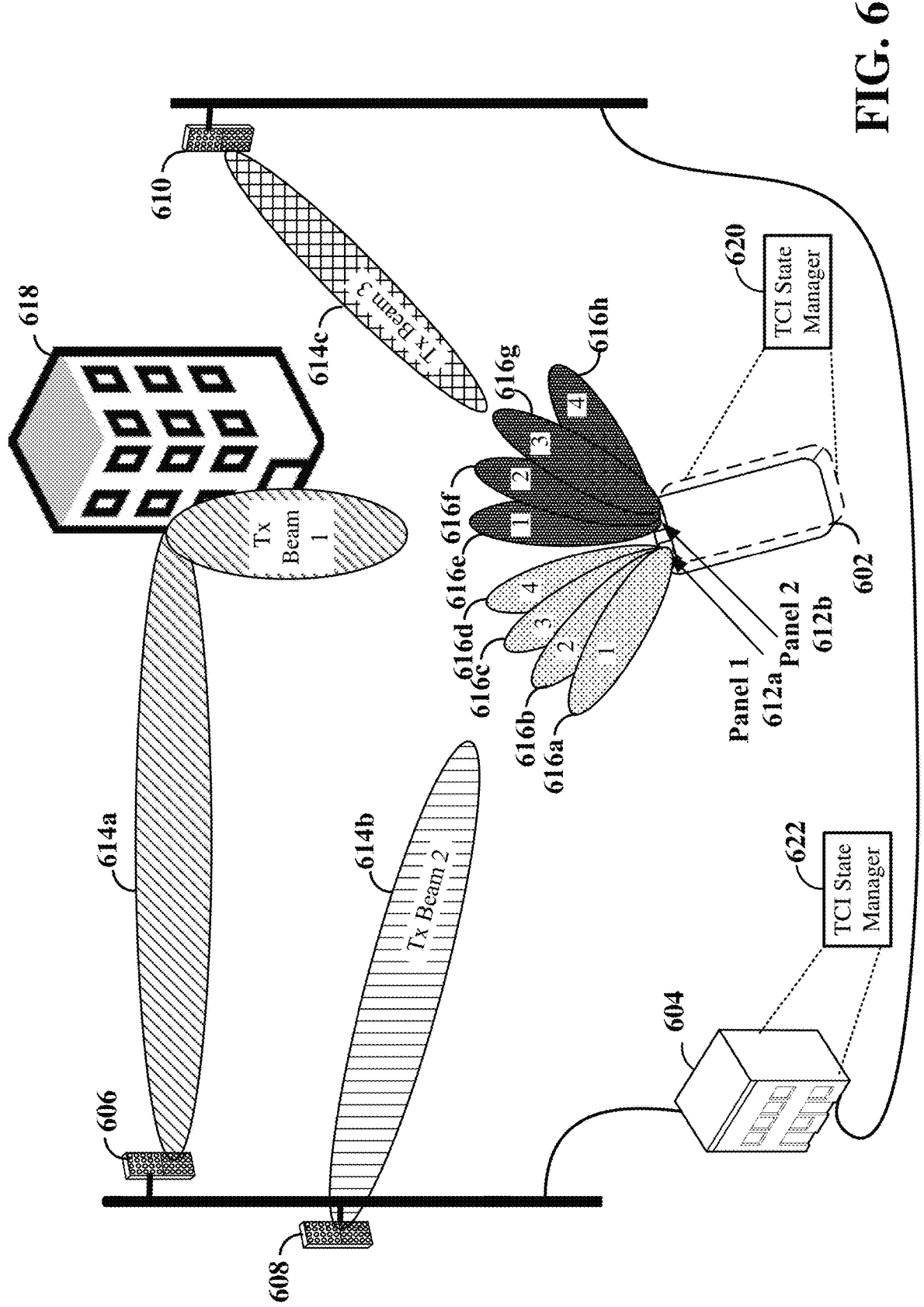
FIG. 6 is a diagram illustrating an example of TCI state group configuration for multi-stream communication according to some aspects.

FIG. 6 is a diagram illustrating an example of a TCI state group configuration between a UE 602 and a RAN entity 604 for multi-stream communication according to some aspects. The RAN entity 604 may be any of the base stations (e.g., gNBs) or scheduling entities illustrated in FIGS. 1, 4, and/or 5, and the UE 602 may be any of the UEs or scheduled entities illustrated in FIGS. 1, 4, and/or 5.

The RAN entity 604 may be configured to coordinate communication amongst a plurality of TRPs 606, 608, and 610 for SDM of multiple streams to the UE 602. The TRPs 606, 608, and 610, may be collocated or non-collocated. In the example shown in FIG. 6, TRPs 606 and 608 are collocated, while TRP 610 is non-collocated with either TRP 606 or TRP 608. Each of the TRPs 606, 608, and 610 may support a plurality of transmit beams 614*a*, 614*b*, and 614*c*, one of which on each TRP 606, 608, and 610 is shown for convenience. Each transmit beam 614*a*, 614*b*, and 614*c* may be utilized to transmit a respective stream to the UE 602 (e.g., via respective line-of-sight paths or reflection from one or more objects 618).

The UE 602 may include a plurality of antenna panels 612*a* and 612*b*, two of which are shown for convenience. The antenna panels 612*a* and 612*b* may support a plurality of beams (e.g., receive beams) 616*a*-616*h*. For example, antenna panel 612*a* may support receive beams 616*a*-616*d* and antenna panel 612*b* may support receive beams 616*e*-616*h*. The set of all receive beams 616*a*-616*h* on active panels (e.g., panels 612*a* and 612*b*) on the UE 602 may be referred to as a collection of beams (e.g., a beam collection). In various aspects of the disclosure, all receive beams in the beam collection may be operated simultaneously by the UE 602.

The UE 602 and the RAN entity 604 may each include a respective TCI state manager 620 and 622 configured to facilitate TCI state groups. The TCI state manager 622 on the RAN entity 604 may configure a plurality of TCI states for the UE 602 based on, for example, a beam report (e.g., an L1 measurement report) and provide the configured TCI states to the UE 602. The TCI state manager 622 on the RAN entity 604 may further configure a plurality of TCI state groups for the UE 602. Each TCI state group includes a plurality of (e.g., two or more) TCI states, each indicating a respective transmit (downlink) beam on which a corresponding stream of a multi-stream PDSCH communication may be transmitted.

In some examples, the TCI state manager 622 on the RAN entity 604 may utilize the beam report sent from the UE 602 as part of a P2 beam refinement procedure or other beam management procedure to configure the TCI state groups. For example, during the beam management procedure, the RAN entity 604 may generate and transmit a plurality of transmit beams 614*a*, 614*b*, and 614*c* (e.g., SSB beams or CSI-RS beams) from the TRPs 606, 608, and 610 within a frequency band (e.g., FR2, FR4-a, FR4-1, FR4, FR5 or other mmWave or higher frequency band). For example, the RAN entity 604 may generate and transmit a respective beam reference signal (e.g., SSB or CSI-RS) on each of the transmit beams 614*a*, 614*b*, and 614*c*. The transmit beams 614*a*, 614*b*, and 614*c* include at least one transmit beam from each TRP 606, 608, and 610, as shown in FIG. 6. In some examples, the transmit beams 614*a*, 614*b*, and 614*c* may include active beams (e.g., transmit beams activated, for example, via a MAC-CE) on the TRPs 606, 608, and 610. In some examples, the transmit beams 614*a*, 614*b*, and 614*c* include sub-beams (e.g., CSI-RS beams) of active SSB beams on each of the TRPs 606, 608, and 610 or SSB beams on each of the TRPs transmitted in a beam sweep across the TRPs 606, 608, and 610. In some examples, the transmit beams 614*a*, 614*b*, and 614*c* include a plurality of SSB beams and/or CSI-RS beams that may not yet be activated for the UE 602.

For each transmit beam 614*a*, 614*b*, and 614*c* transmitted during the beam management procedure, the UE 602 may obtain a beam quality metric on each of the receive beams 616*a*-616*h* in the beam collection in parallel (e.g., using a Butler matrix) or serially during a measurement period to generate a beam quality metric vector for each transmit beam 614*a*, 614*b*, and 614*c*. Examples of beam quality metrics include, but are not limited to, RSRP or SINR. For example, the UE 602 may measure the RSRP of a transmit beam (e.g., transmit beam 614a) on each of the receive beams 616a-616h and generate an RSRP vector of the measured RSRP values of the transmit beam 614a on each of the receive beams 616a-616h. The UE 602 may then repeat the parallel or serial RSRP measurements of each of the other transmit beams 614b and 614c to generate respective RSRP vectors for transmit beams 614b and 614c. The UE 602 may obtain the RSRP vectors by measuring the RSRP of the beam reference signal (e.g., SSB or CSI-RS) transmitted on the transmit beams 614a, 614b, and 614c.

The UE 602 may then generate a beam report indicating a plurality of beam groups based on the beam quality metric vectors. In some examples, the beam report includes a list of two or more recommended beam groups identified by the UE 602 based on the respective beam quality metric vectors. In other examples, the beam report includes the respective beam quality metric vector for each of the transmit beams 614a, 614b, and 614c. The RAN entity 604 may then be configured to group the transmit beams into the beam groups based on the beam report, such that each beam group includes one transmit beam from each of two or more of the TRPs 606, 608, and 610 for multi-stream communication between the TRPs 606, 608, and 610 and the UE 602. In some examples, for each beam group, the selected transmit beams in that beam group provide a minimal mutual interference (e.g., minimum inter-beam interference) therebetween. For example, the transmit beams selected for each beam group may have the strongest RSRP that provide the minimum mutual interference therebetween.

In some examples, the TCI state manager 622 on the RAN entity 604 may transmit a radio resource control (RRC) configuration of the plurality of TCI state groups (e.g., an RRC TCI state groups table) to the UE 602. The RRC TCI state groups table may include a respective TCI state group identifier and a list of the TCI states included within the respective TCI state group for each of the TCI state groups. The TCI state manager 620 on the UE 602 may then store the RRC TCI state groups table for use in receiving a subsequent multi-stream communication. In some examples, the TCI state manager 622 on the RAN entity 604 may further transmit an activation message (e.g., a MAC-CE) to the UE 602 that activates a set of active TCI state groups of the plurality of TCI state groups. In some examples, the set of active TCI state groups includes up to eight active TCI state groups that may be selected from for PDSCH transmissions. The TCI state manager 620 on the UE 602 may further store the set of active TCI state groups. For a multi-stream PDSCH communication, the TCI state manager 622 on the RAN entity 604 may then select one of the active TCI state groups for transmission of the multi-stream PDSCH communication and include the selected active TCI state group in the control information (e.g., DCI) scheduling the multi-stream PDSCH communication. For example, the TCI state manager 622 on the RAN entity 604 may select the TCI state group corresponding to the beam group including transmit beams 614a and 614c for the multi-stream PDSCH communication.

Figure 7:
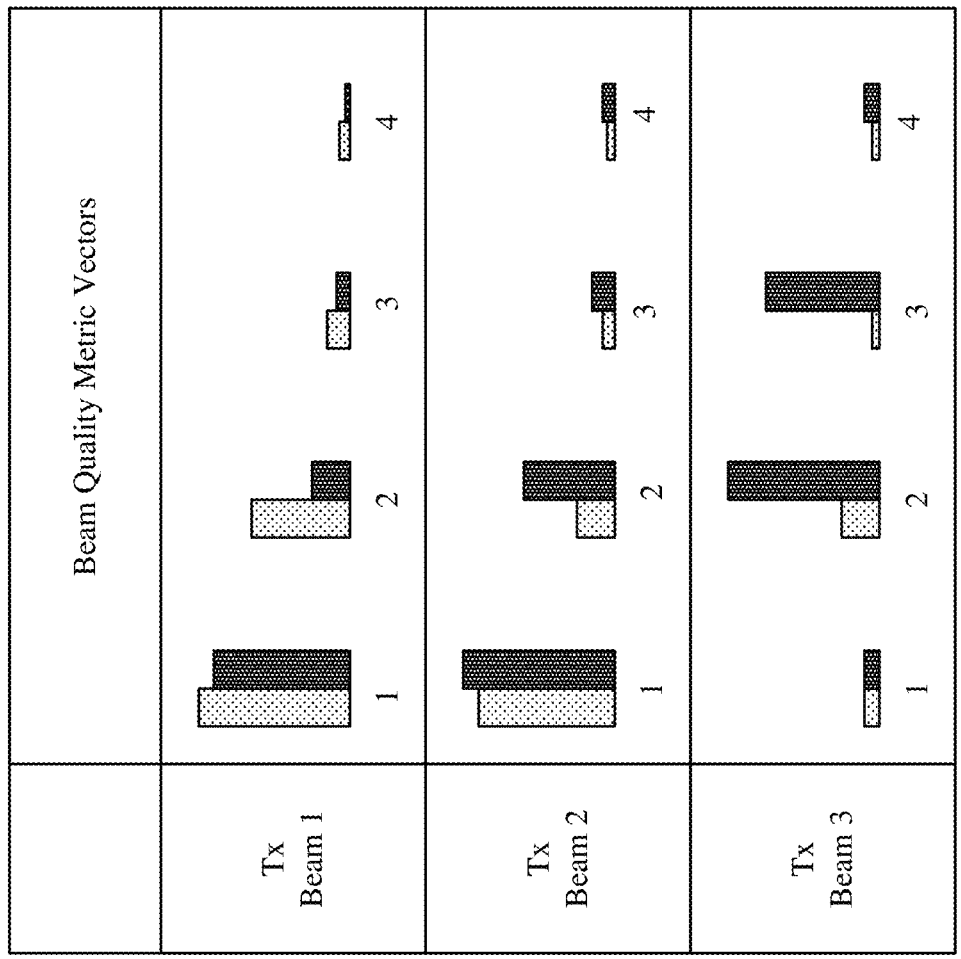
FIG. 7 is a diagram illustrating an example of beam quality metric vectors obtained during the beam management procedure of FIG. 6 according to some aspects.
Figure 7:
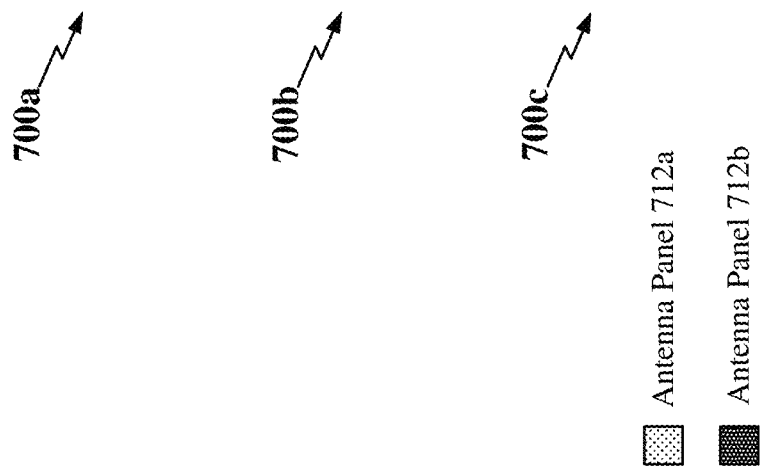

FIG. 7 is a diagram illustrating an example of beam quality metric vectors 700a, 700b, and 700c obtained during the beam management procedure of FIG. 6 according to some aspects. Each beam quality metric vector 700a, 700b, and 700c may correspond, for example, to an RSRP vector. A first RSRP vector 700a includes the RSRP of transmit beam 614a (Tx beam 1) as measured in parallel or serially on each of the four receive beams 616a-616d on antenna panel 612a and as measured in parallel or serially on each of the four receive beams 616e-616h on antenna panel 612b. A second RSRP vector 700b includes the RSRP of transmit beam 614b (Tx beam 2) as measured in parallel or serially on each of the four receive beams 616a-616d on antenna panel 612a and as measured in parallel or serially on each of the four receive beams 616e-616h on antenna panel 612b. A third RSRP vector 700c includes the RSRP of transmit beam 614c (Tx beam 3) as measured in parallel or serially on each of the four receive beams 616a-616d on antenna panel 612a and as measured in parallel or serially on each of the four receive beams 616e-616h on antenna panel 612b.

As can be seen in the example of FIG. 7, candidate receive beams to form a BPL with Tx beam 1 (e.g., receive beams having the strongest RSRP of Tx beam 1) may include the first receive beam (e.g., receive beam 616a) on antenna panel 612a, the first receive beam (e.g., receive beam 616e) on antenna panel 612b, and the second receive beam (e.g., receive beam 616b) on antenna panel 612a. In addition, candidate receive beams to form a BPL with Tx beam 2 (e.g., receive beams having the strongest RSRP of Tx beam 2) may include the first receive beam (e.g., receive beam 616a) on antenna panel 612a, the first receive beam (e.g., receive beam 616e) on antenna panel 612b, and the second receive beam (e.g., receive beam 616f) on antenna panel 612b. Furthermore, candidate receive beams to form a BPL with Tx beam 3 (e.g., receive beams on which the strongest RSRP of Tx beam 3 was measured) may include the second receive beam (e.g., receive beam 616f) on antenna panel 612b and the third receive beam (e.g., receive beam 616g) on antenna panel 612b.

To minimize the mutual interference experienced by the UE 602 between BPLs, different receive beams on the same or different panels may be selected to form BPLs with respective ones of the transmit beams. For example, the RAN entity 604 (or UE 602) may select the first receive beam (e.g., receive beam 616e) on the second antenna panel 612b to form a BPL with Tx beam 2 (e.g., transmit beam 614b) and the second receive beam (e.g., receive beam 616f) on the second antenna panel 612b to form a BPL with Tx beam 3 (e.g., transmit beam 614c). In this example, transmit beams 614b and 614c may form a beam group. Thus, the RAN entity 604 may configure a TCI state group corresponding to the beam group including transmit beams 614b and 614c.

In addition, the RAN entity 604 (or the UE 602) may also select the first receive beam (e.g., receive beam 616a) on the first antenna panel 612a to form a BPL with Tx beam 1 (e.g., transmit beam 614a) and the second receive beam (e.g., receive beam 616f) on the second antenna panel 612b to form a BPL with Tx beam 3 (e.g., transmit beam 614c). In this example, transmit beams 614a and 614c may form a beam group. Thus, the RAN entity 604 may also configure a TCI state group corresponding to the beam group including transmit beams 614a and 614c. The number of selected BPLs (e.g., the number of transmit beams within each beam group) may correspond to the number of different data streams configured for communication between the RAN entity 604 and the UE 602.

Figure 8:
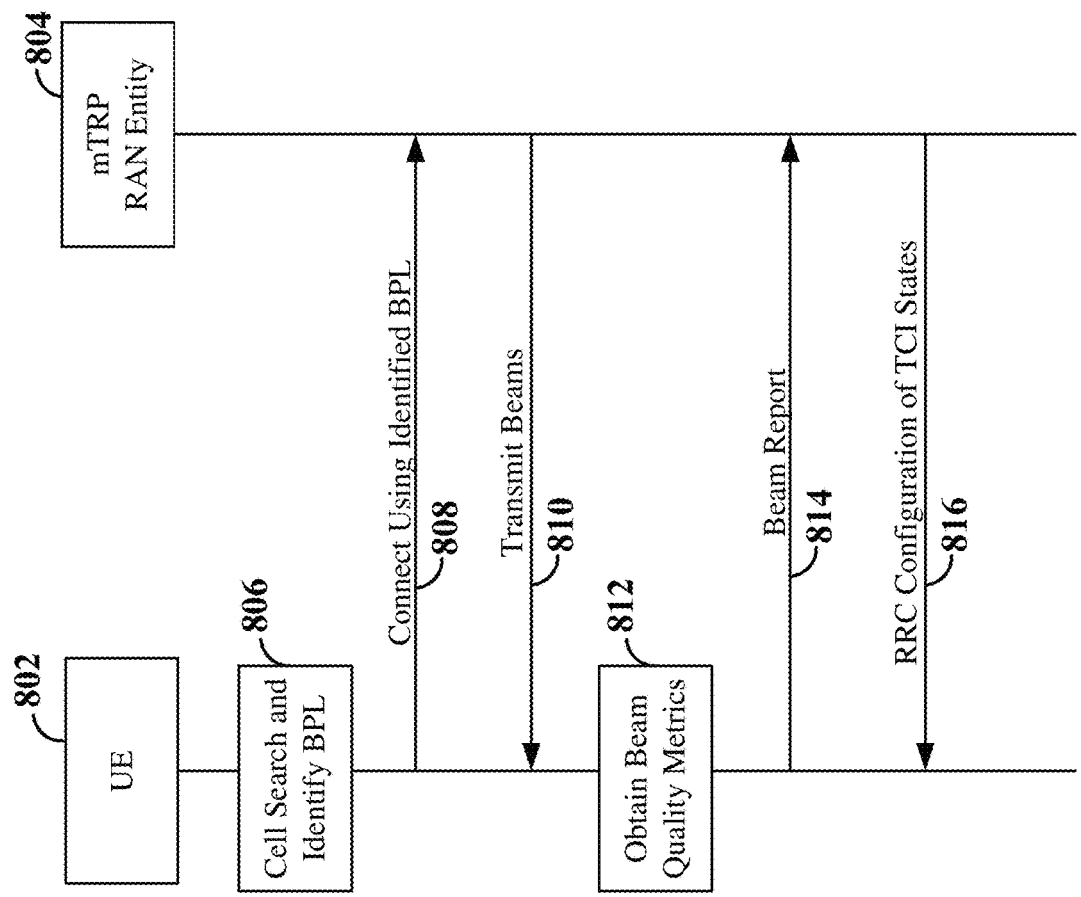
FIG. 8 is a signaling diagram illustrating an exemplary TCI state management procedure according to some aspects.

FIG. 8 is a signaling diagram illustrating an exemplary TCI state management procedure between a UE 802 and an m-TRP RAN entity 804 according to some aspects. The m-TRP RAN entity 804 may be any of the base stations (e.g., gNBs) or scheduling entities illustrated in FIGS. 1, and/or 4-6, and the UE 802 may be any of the UEs or scheduled entities illustrated in FIGS. 1, and/or 4-6. The m-TRP RAN entity 804 may be configured to coordinate communication amongst a plurality of TRPs (m TRPs), which may be collocated or non-collocated, for the multi-stream communication.

At 806, the m-TRP RAN entity 804 may perform an initial cell search to identify a respective beam pair link (BPL) associated with each of the TRPs. For example, the UE 802 may perform a respective P1 beam management procedure to scan a plurality of transmit beams of each of the TRPs on a plurality of receive beams of the UE 802 to select a respective beam pair link (BPL) associated with each of the TRPs. At 808, the UE 802 may then perform a respective PRACH procedure over the selected BPLs on each of the TRPs to connect to the m-TRP RAN entity 804.

At 810, the m-TRP RAN entity 804 may transmit a plurality of transmit beams in a mmWave frequency band (e.g., FR2 or higher frequency band), each carrying a respective beam reference signal (e.g., SSB or CSI-RS) to the UE 802. The m-TRP RAN entity 804 may transmit the plurality of transmit beams during a P2 beam refinement procedure or other beam management procedure in which a beam report (e.g., an L1-RSRP report) is generated. In some examples, each of the m-TRPs transmits at least one of the plurality of transmit beams. In other examples, a subset of the m-TRPs transmits the transmit beams towards the UE 802. For example, the subset of the m-TRPs may include active TRPs activated for multi-cell (multi-TRP) communication with the UE 802.

At 812, the UE 802 may obtain a beam quality metric on each of the received transmit beams. For example, the UE 802 may measure the beam quality metric (e.g., RSRO) of each of the received transmit beams on one or more receive beams. In some examples, the UE 802 may measure the RSRP of each of the received transmit beams from each of the TRPs on the corresponding receive beams selected during the initial access procedure. At 814, the UE may generate and transmit a beam report (e.g., L1 measurement report) to the m-TRP RAN entity 804. The beam report may include, for example, the respective beam index (e.g., SRI or CRI) and beam measurement (e.g., RSRP) of one or more of the received transmit beams for each of the TRPs.

At 816, the m-TRP RAN entity 804 may configure a plurality of TCI states for the UE 802 and transmit an RRC configuration of the plurality of TCI states to the UE 802. For example, based on the beam report, the m-TRP RAN entity 804 may select a plurality of transmit beams across the TRPs for communication with the UE and configure a respective TCI state for each of the selected transmit beams. The selected transmit beams may, for example, have the highest RSRP or have a spatial direction within, for example, a pre-configured three-dimensional area around the transmit beam(s) having the highest RSRP.

Figure 9:
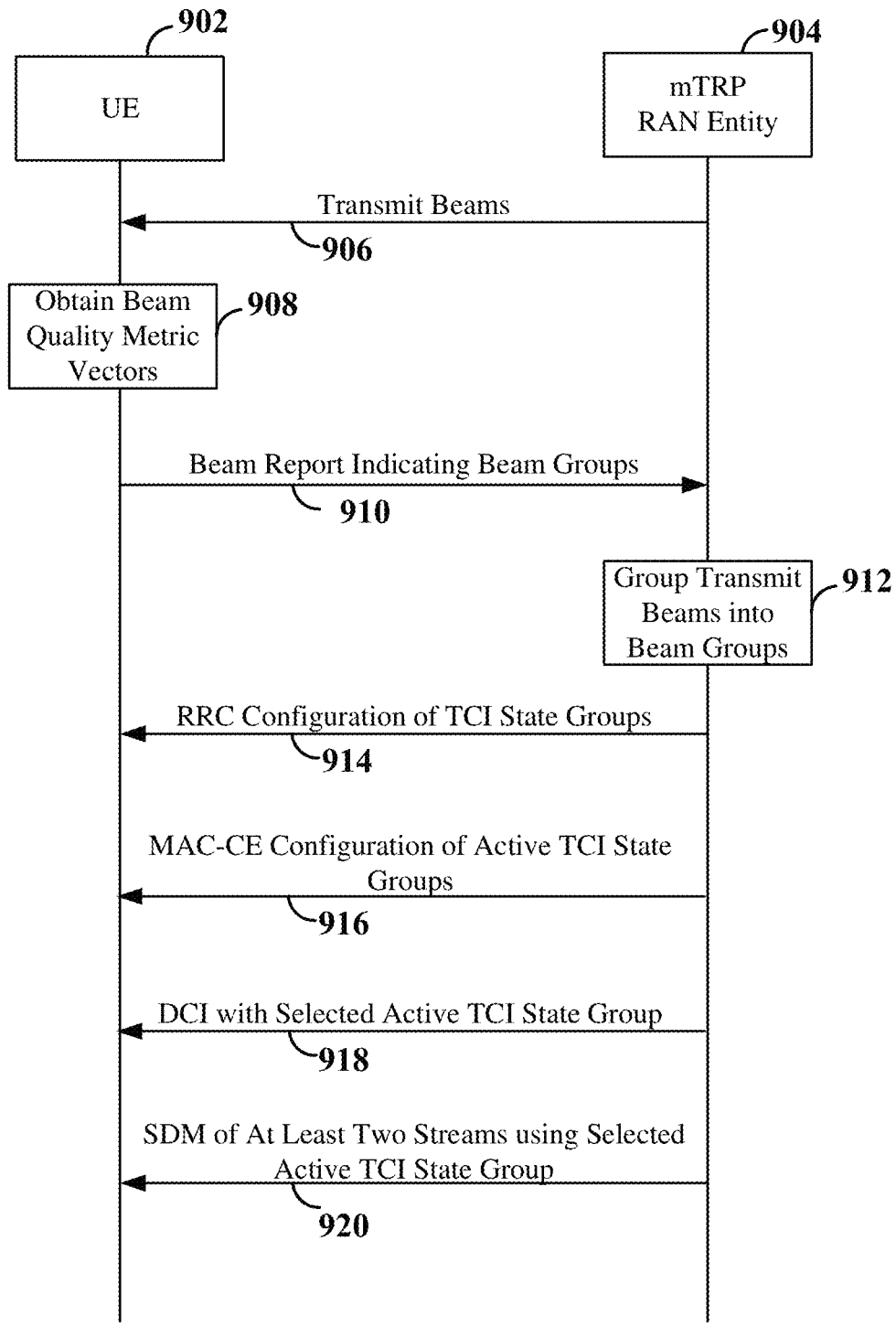
FIG. 9 is a signaling diagram illustrating another exemplary TCI state management procedure for multi-stream communication according to some aspects.

FIG. 9 is a signaling diagram illustrating another exemplary TCI state management procedure between a UE 902 and an m-TRP RAN entity 904 for multi-stream communication according to some aspects. The m-TRP RAN entity 904 may be any of the base stations (e.g., gNBs) or scheduling entities illustrated in FIGS. 1, 4-6, and/or 8 and the UE 902 may be any of the UEs or scheduled entities illustrated in FIGS. 1, 4-6, and/or 8. The m-TRP RAN entity 904 may be configured to coordinate communication amongst a plurality of TRPs (m TRPs), which may be collocated or non-collocated, for the multi-stream communication At 906, the m-TRP RAN entity 904 may initiate a beam management procedure by transmitting a plurality of transmit beams in a mmWave frequency band (e.g., FR2 or higher frequency band), each carrying a respective beam reference signal (e.g., SSB or CSI-RS) to the UE 902. The beam management procedure may be the beam management procedure described at 810 of FIG. 8 or a second (subsequent) beam management procedure. In some examples, the plurality of transmit beams includes the transmit beams corresponding to the RRC configured TCI states for the UE 902. In other examples, the plurality of transmit beams includes a subset of the transmit beams corresponding to the RRC configured TCI states for the UE 902. For example, the subset of transmit beams may include active transmit beams activated (e.g., via MAC-CE) for communication with the UE 902. In some examples, each of the m-TRPs transmits at least one of the plurality of transmit beams. In other examples, a subset of the m-TRPs transmits the transmit beams towards the UE 902. For example, the subset of the m-TRPs may include active TRPs activated for multi-cell (multi-TRP) communication with the UE 902.

At 908, the UE obtains a respective beam quality metric vector for each of the transmit beams. For example, for each transmit beam, the UE 902 may measure a respective beam quality metric (e.g., RSRP) on each of a plurality of receive beams during a measurement period. The receive beams may include all receive beams on all antenna panels of the UE 902 or a subset of the receive beams or a subset of the antenna panels. The UE 902 may then place the beam quality metric values measured on each of the receive beams for each of the transmit beams in a respective beam quality metric vector for each of the transmit beams.

In some examples, for each transmit beam, the UE 902 may measure the respective beam quality metric on each of the plurality of receive beams in parallel (e.g., at the same time). For example, the UE 902 may utilize a Butler matrix to perform the parallel measurements. Here, the parallel measurements on each of the receive beams are conducted on a single transmit beam, such that the parallel measurements are performed substantially simultaneously. In this example, the measurement period may correspond to a duration of time during which the parallel measurements are performed. In some examples, for each transmit beam, the UE 902 may measure the respective beam quality metric on each of the plurality of receive beams serially (e.g., on one receive beam at a time). Here, the serial measurements on each of the receive beams are conducted on respective repetitions of the transmit beam, such that one measurement is obtained on each receive beam at a time using one of the repetitions of the transmit beam. In this example, the measurement period may correspond to a duration of time during which all of the repetitions of the transmit beam are transmitted and serially measurements are obtained of the repetitions on respective receive beams of the UE. In some examples, for each transmit beam, the UE 902 may measure the respective beam quality metric on each of the plurality of receive beams in parallel for each of a plurality of repetitions of the transmit beam. In this example, the UE 902 may utilize the repetitions of the transmit beam to double the vector length. Here, the measurement period may correspond to a duration of time during which all repetitions of the transmit beam are transmitted and substantially simultaneous measurements are obtained on each of the receive beams for each of the repetitions.

At 910, the UE 902 may then generate and transmit a beam report indicating a plurality of beam groups based on the beam quality metric vectors. In some examples, the beam report includes the plurality of beam groups (e.g., a list of two or more recommended beam groups) identified by the UE 902 based on the respective beam quality metric vectors.

In other examples, the beam report includes the respective beam quality metric vector for each of the received transmit beams.

At 912, the m-TRP RAN entity 904 may group the plurality of transmit beams into the plurality of beam groups based on the beam report. In examples in which the beam report includes plurality of beam groups, the m-TRP RAN entity 904 may group the plurality of transmit beams into the plurality of beam groups indicated in the beam report. In examples in which the beam report includes beam quality metric vectors, the m-TRP RAN entity 904 may group the plurality of transmit beams into the plurality of beam groups based on the beam quality metric vectors. For example, the transmit beams selected for a particular beam group may have the strongest RSRP that provides the minimum mutual interference (e.g., minimum inter-beam interference) therebetween based on selected BPLs.

At 914, m-TRP RAN entity 904 may configure a plurality of TCI state groups for the UE 902 and transmit an RRC configuration of the plurality of TCI state groups to the UE 902. Each TCI state group corresponds to a respective one of the plurality of beam groups and includes a plurality of (e.g., two or more) TCI states, each corresponding to a respective one of the transmit beams in the respective beam group. In some examples, the RRC configuration of the plurality of TCI state groups includes an RRC TCI state groups table. The RRC TCI state groups table may include a respective TCI state group identifier and a list of the TCI states included within the respective TCI state group for each of the TCI state groups.

At 916, the m-TRP RAN entity 904 may select a set of active TCI state groups from the plurality of TCI state groups and transmit an activation message (e.g., a MAC-CE) to the UE 902 that activates the set of active TCI state groups. In some examples, the set of active TCI state groups includes up to eight active TCI state groups that may be selected from for multi-stream PDSCH transmissions.

At 918, the m-TRP RAN entity 904 may select one of the active TCI state groups for transmission of a multi-stream PDSCH communication and transmit control information (e.g., DCI) including the selected active TCI state group. The control information may further include scheduling information scheduling the multi-stream PDSCH communication. For example, the scheduling information may include time-frequency resources on which the multi-stream PDSCH communication is to be transmitted, a selected MCS, a selected rank, and other suitable scheduling information. In some examples, each BPL (e.g., as indicated by the TCI state group) on which the PDSH communication is transmitted may have a rank of two using horizontal/vertical polarization. In some examples, the DCI may include a plurality of bits indicating the selected TCI state group for the multi-stream PDSCH communication. For example, the DCI may include three bits indicating the selected TCI state group.

At 920, the m-TRP RAN entity 904 may SDM at least two streams of a PDSCH to the UE 902 using the selected active TCI state group. For example, the m-TRP RAN entity 904 may SDM each of the at least two streams from a different respective TRP on a respective transmit beam corresponding to that TRP.

Figures 10A, 10B:
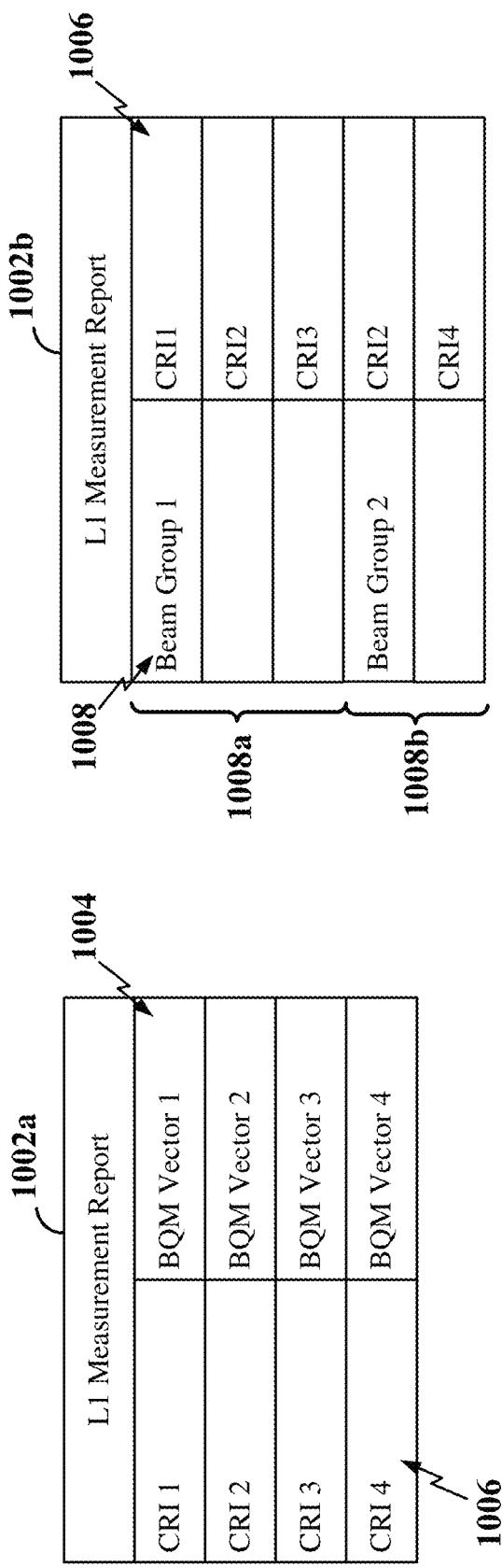
FIGS. 10A and 10B are diagrams illustrating examples of a beam report including an indication of beam groups according to some aspects.

FIGS. 10A and 10B are diagrams illustrating examples of beam reports 1002a and 1002b including an indication of beam groups according to some aspects. The beam reports 1002a and 1002b may each be, for example, an L1 measurement report. In the example shown in FIG. 10A, the L1 measurement report 1002a includes a respective beam quality metric (BQM) vector 1004 for each of a plurality of transmit beams 1006 identified by a respective CSI-RS resource indicator (CRI). For example, the L1 measurement report 1002a may include BQM Vectors 1-4, each associated with a respective CRI 1-4. Each BQM vector 1004 may include, for example, an RSRP vector, such as the RSRP vectors 700a-700c shown in FIG. 7.

In the example shown in FIG. 10B, the L1 measurement report 1002b includes a plurality of beam groups 1008, each including a plurality of transmit beams 1006. For example, a first beam group 1008a (beam group 1) may include, for example, transmit beams CR1, CR2, and CR3. In addition, a second beam group 1008b (beam group 2) may include, for example, transmit beams CR2 and CR4. In some examples, the L1 measurement report 1002b may include the plurality of beam groups 1008, together with other beam quality metric information (not shown) for one or more transmit beams. For example, the L1 measurement report 1002b may further include the CRI and measured RSRP for one or more transmit beams having the highest RSRP. As another example, the L1 measurement report 1002b may further include the CRI and associated beam quality metric vector for each of the plurality of transmit beams (as shown in FIG. 10A).

FIGS. 11A and 11B are diagram illustrating radio resource control (RRC) TCI state tables 1100a and 1100b according to some aspects. The RRC TCI state table 1100a shown in FIG. 11A illustrates an example of a TCI state 1102 configured for a UE. Thus, the RRC TCI state table 1100a may correspond to a TCI state table including a plurality of TCI states configured for the UE. The TCI state 1102 includes a TCI state ID 1104 identifying the TCI state, along with a plurality of QCL information 1106 (e.g., QCL-TypeA, QCL-TypeB, etc.). For example, QCL-TypeA may indicate a downlink reference signal (e.g., SSB or CSI-RS) from which the channel properties of a downlink channel or signal may be inferred. QCL-TypeB and QCL-TypeC may also indicate downlink reference signals from which specific channel properties (e.g., Doppler shift and/or Doppler spread for QCL-TypeB and average delay and/or delay spread for QCL-TypeC) may be inferred. QCL-TypeD may indicate a spatial RX parameter (e.g., spatial property of the beam on which a downlink channel or signal is transmitted). The spatial property of the beam may be inferred from the beam utilized for transmission of a downlink reference signal and may indicate, for example, at least one of a beam direction or a beam width.

The RRC state table 1100b shown in FIG. 11B illustrates an example of a TCI state group 1108 configured for a UE. Thus, the RRC TCI state table 1100b may correspond to a TCI state group table including a plurality of TCI state groups configured for the UE. The TCI state group 1108 includes a TCI state group ID 1110 identifying the TCI state group, along with a plurality of TCI states 1112 included within the TCI state group 1108. Each TCI state 1112 may correspond, for example, to one of the TCI states 1102 included in the TCI state table 1100a.

Figure 12:
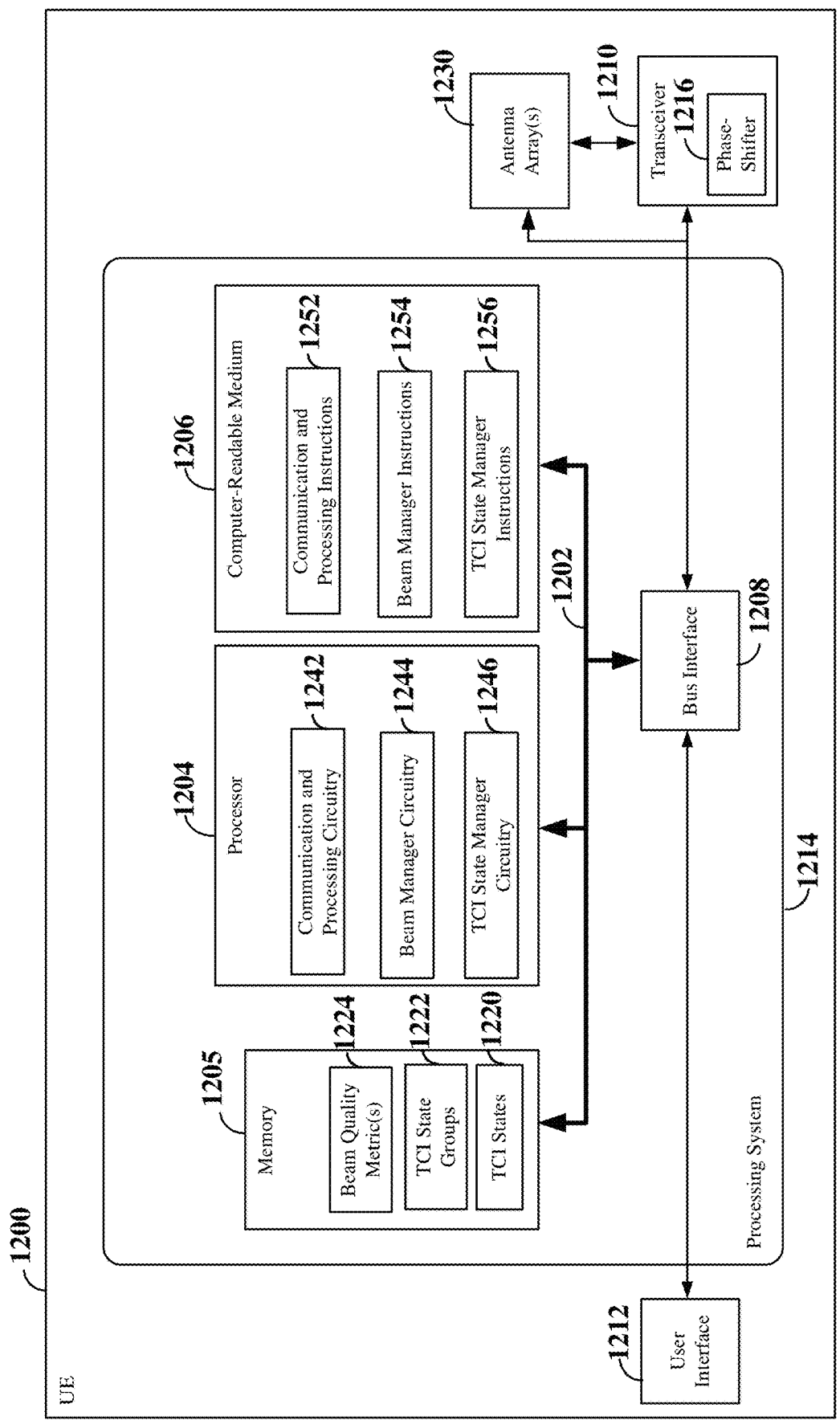
FIG. 12 is a block diagram illustrating an example of a hardware implementation for a UE employing a processing system according to some aspects.

FIG. 12 is a conceptual diagram illustrating an example of a hardware implementation for an exemplary UE 1200 employing a processing system 1214. For example, the UE 1200 may be any of the UEs or scheduled entities illustrated in any one or more of FIGS. 1, 2, 5-7, and/or 9.

The UE 1200 may be implemented with a processing system 1214 that includes one or more processors 1204. Examples of processors 1204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1200 may be configured to perform any one or more of the functions described herein. That is, the processor 1204, as utilized in a UE 1200, may be used to implement any one or more of the processes described below in connection with FIG. 12.

The processor 1204 may in some instances be implemented via a baseband or modem chip and in other implementations, the processor 1204 may itself comprise a number of devices distinct and different from a baseband or modem chip (e.g., in such scenarios as may work in concert to achieve aspects discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1214 may be implemented with a bus architecture, represented generally by the bus 1202. The bus 1202 may include any number of interconnecting buses and bridges depending on the specific application of the processing system 1214 and the overall design constraints. The bus 1202 communicatively couples together various circuits including one or more processors (represented generally by the processor 1204), a memory 1205, and computer-readable media (represented generally by the computer-readable medium 1206). The bus 1202 may also link various other circuits such as timing sources, peripherals, voltage regulators, and power management circuits, which are well known in the art, and therefore, will not be described any further.

A bus interface 1208 provides an interface between the bus 1202 and a transceiver 1210. The transceiver 1210 provides a means for communicating with various other apparatus over a transmission medium (e.g., air interface). In some examples, the transceiver 1210 may include a phase-shifter 1216 for digital and/or analog beamforming via one or more antenna array(s) 1230. Each antenna array 1230 may correspond, for example, to an antenna panel. Multiple antenna panels may be positioned in various locations on the UE 1200 to provide full spatial coverage and meet maximum permissible exposure requirements. A user interface 1212 (e.g., keypad, display, speaker, microphone, joystick) may also be provided.

The processor 1204 is responsible for managing the bus 1202 and general processing, including the execution of software stored on the computer-readable medium 1206. The software, when executed by the processor 1204, causes the processing system 1214 to perform the various functions described below for any particular apparatus. The computer-readable medium 1206 and the memory 1205 may also be used for storing data that is manipulated by the processor 1204 when executing software.

One or more processors 1204 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1206.

The computer-readable medium 1206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1206 may reside in the processing system 1214, external to the processing system 1214, or distributed across multiple entities including the processing system 1214. The computer-readable medium 1206 may be embodied in a computer program product. In some examples, the computer-readable medium 1206 may be part of the memory 1205. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1204 may include circuitry configured for various functions. For example, the processor 1204 may include communication and processing circuitry 1242, configured to communicate with a RAN entity, such as a m-TRP base station or other scheduling entity. In some examples, the communication and processing circuitry 1242 may include one or more hardware components that provide the physical structure that performs processes related to wireless communication (e.g., signal reception and/or signal transmission) and signal processing (e.g., processing a received signal and/or processing a signal for transmission).

In some examples, the communication and processing circuitry 1242 may be configured to receive and process downlink beamformed signals at a mmWave frequency (e.g., FR2, FR4-a, FR4-1, FR4, FR5, etc.) via the transceiver 1210 and the antenna arrays 1230 (e.g., using the phase-shifter 1216). In addition, the communication and processing circuitry 1242 may be configured to generate and transmit uplink beamformed signals at a mmWave frequency via the transceiver 1210 and antenna arrays 1230 (e.g., using the phase-shifter 1216). For example, the communication and processing circuitry 1242 may be configured for multi-stream communication with the m-TRP RAN entity via spatial division multiplexing (SDM) of the multiple streams on corresponding multiple beam pair links (BPLs) between the UE 1200 and respective TRPs.

The communication and processing circuitry 1242 may further be configured to receive a plurality of transmit beams from a plurality of TRPs of a m-TRP RAN entity on a plurality of receive beams via the antenna arrays 1230 and transceiver 1210. Each of the transmit beams may carry a respective beam reference signal (e.g., an SSB or CSI-RS). The communication and processing circuitry 1242 may further be configured to transmit a beam report (e.g., an L1 measurement report) to the m-TRP RAN entity. The communication and processing circuitry 1242 may further be configured to execute communication and processing software 1252 stored in the computer-readable medium 1206 to implement one or more of the functions described herein.

The processor 1204 may further include beam manager circuitry 1244, configured to perform beam management for SDM multi-stream communication. The beam manager circuitry 1244 may be configured to perform beam management for SDM multi-stream communication during a beam refinement procedure (e.g., P2 procedure) or other beam management procedure in which a beam report is generated.

For each transmit beam of the m-TRP RAN entity received by the UE 1200, the beam manager circuitry 1244 may be configured to obtain a respective beam quality metric (e.g., RSRP, SINR, etc.) 1224 on one or more of a plurality of receive beams of the antenna array(s) 1230. The beam quality metrics 1224 may be stored, for example, in memory 1205. In some examples, the beam manager circuitry 1244 may be configured to obtain a respective beam quality metric 1244 of each transmit beam on a corresponding one of the plurality of receive beams. For example, the beam manager circuitry 1244 may be configured to measure the respective RSRP of each transmit beam associated with a particular TRP on a corresponding one of the receive beams selected for that particular TRP during initial cell access (e.g., a P1 procedure).

In other examples, the beam manager circuitry 1244 may be configured to obtain the respective beam quality metric 1224 on each of the plurality of receive beams in parallel or serially during a respective measurement period. For example, the beam manager circuitry 1244 may be configured to utilize a Butler matrix to obtain the beam quality metrics 1224 on each of the receive beams in parallel. The receive beams may include all receive beams on all antenna arrays 1230 (antenna panels) of the UE 1200 or a subset of the receive beams or a subset of the antenna arrays. The beam quality metrics 1224 may be obtained, for example, by performing measurements on the transmit beams utilizing respective beam reference signals (e.g., SSBs or CSI-RSs) carried on the transmit beams.

The beam manager circuitry 1244 may further be configured to generate a respective beam quality metric vector for each of the transmit beams. For example, the beam manager circuitry 1244 may place all obtained beam quality metric values 1224 for each of the transmit beams in a respective beam quality metric vector. In some examples, each beam quality metric vector corresponds to an RSRP vector. In some examples, the RSRP vectors for the transmit beams indicates a mutual interference between the transmit beams as observed at the UE 1200.

The beam manager circuitry 1244 may further be configured to generate a beam report (e.g., an L1 measurement report) including the beam quality metrics (e.g., RSRP values) 1224 for one or more transmit beams. The beam manager circuitry 1244 may further be configured to transmit the beam report to the m-TRP RAN entity via the communication and processing circuitry 1242 and transceiver 1210.

In some examples, the beam report may include the beam quality metric (e.g., RSRP) 1224 of one or more of the transmit beams. For example, the beam report may include the beam quality metric of the transmit beam(s) having the highest RSRP. In this example, the beam quality metrics 1244 may include initial beam quality metrics obtained, for example, during a P2 procedure, and the beam report may correspond to an initial beam report.

In other examples, the beam manager circuitry 1244 may generate the beam report including an indication of a plurality of beam groups. The beam report including the indication of the plurality of beam groups may be generated during the P2 procedure or other subsequent beam management procedure. In examples in which the beam report is generated during a P2 procedure, the beam report includes the indication of the plurality of beam groups instead of the individual beam quality metric(s) 1224 of one or more transmit beams. The indication of the plurality of beam groups may include the plurality of beam groups or the beam quality metric vectors themselves. The beam manager circuitry 1244 may further be configured to execute beam manager instructions 1254 (e.g., software) stored in the computer-readable medium 1206 to implement one or more of the functions described herein.

The processor 1204 may further include TCI state manager circuitry 1246, configured to manage TCI states 1220 and TCI state groups 1222 for the UE 1200. The TCI state manager circuitry 1246 may correspond, for example, to any of the UE TCI state managers shown in FIGS. 1 and/or 3-6.

In some examples, the TCI state manager circuitry 1246 may be configured to receive a plurality of TCI states 1220 configured for the UE 1200 from the m-TRP RAN entity via the communication and processing circuitry 1242 and transceiver 1210. The TCI state manager circuitry 1246 may further be configured to store the plurality of TCI states 1220 within, for example, memory 1205. In some examples, the TCI state manager circuitry 1246 may receive an RRC configuration of the plurality of TCI states 1220. The RRC configuration may include, for example, an RRC TCI states table including each of the TCI states 1220 configured for the UE 1200.

The TCI state manager circuitry 1246 may further be configured to receive a plurality of TCI state groups 1222 configured for the UE 1200 from the m-TRP RAN entity via the communication and processing circuitry 1242 and the transceiver 1210. The TCI state manager circuitry 1246 may further be configured to store the plurality of TCI state groups 1222 within, for example, memory 1205. In some examples, the TCI state manager circuitry 1246 may receive an RRC configuration of the plurality of TCI state groups 1222. The RRC configuration may include, for example, an RRC TCI state groups table including each of the TCI state groups 1222 configured for the UE 1200. Each TCI state group 1222 may include, for example, a respective TCI state group identifier and a list of the TCI states 1220 (e.g., previously configured TCI states for the UE 1200) included within the respective TCI state group for each of the TCI state groups 1222.

The TCI state manager circuitry 1246 may further be configured to determine the plurality of beam groups based on the beam quality metric vectors obtained by the beam manager circuitry 1244. For example, from the beam quality metric vectors, the TCI state manager circuitry 1246 may select the beam groups such that each beam group includes a respective transmit beam associated with each of two or more of the TRPs of the multi-TRP RAN entity that have minimal mutual interference (e.g., minimum inter-beam interference) therebetween. In an example, the selected transmit beams for a particular beam group have the highest RSRP that are also associated with BPLs that have the minimum inter-beam interference experienced at the UE.

The TCI state manager circuitry 1246 may further be configured to receive an activation or deactivation message for one or more of the plurality of TCI state groups 1222. The activation or deactivation message may be, for example, a MAC-CE. In some examples, the TCI state manager circuitry 1246 may be configured to receive an activation message that activates a set of active TCI state groups. In some examples, the set of active TCI state groups includes up to eight active TCI state groups that may be selected from for multi-stream PDSCH transmissions.

The TCI state manager circuitry 1246 may further be configured to receive control information (e.g., DCI) including a selected active TCI state group for a multi-stream PDSCH communication. The control information may further include scheduling information scheduling the multi-stream PDSCH communication. In some examples, the DCI may include a plurality of bits indicating the selected TCI state group for the multi-stream PDSCH communication. For example, the DCI may include three bits indicating the selected TCI state group. The TCI state manager circuitry 1246 may further operate in coordination with the communication and processing circuitry 1242 and beam manager circuitry 1244 to receive the SDM multi-stream PDSCH communication utilizing the selected active TCI state. The TCI state manager circuitry 1246 may further be configured to execute TCI state manager instructions 1256 (e.g., software) stored in the computer-readable medium 1206 to implement one or more of the functions described herein.

Figure 13:
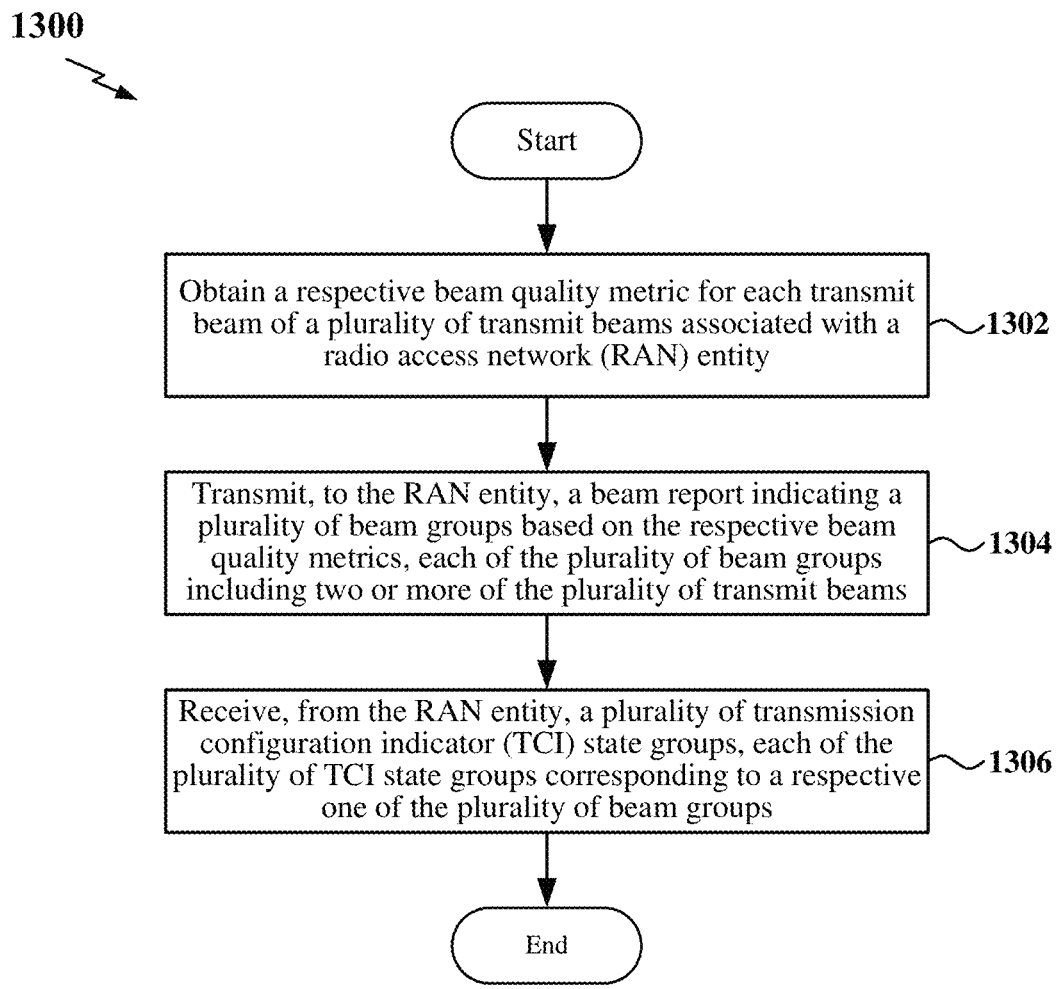
FIG. 13 is a flow chart of an exemplary method for TCI state group management for multi-stream communication at a UE according to some aspects.

FIG. 13 is a flow chart 1300 illustrating an example of a method for TCI state management for multi-stream communication at a user equipment (UE) according to some aspects. As described below, some or all illustrated features may be omitted in a particular implementation within the scope of the present disclosure, and some illustrated features may not be required for implementation of all aspects. In some examples, the method may be performed by the UE 1200, as described above and illustrated in FIG. 12, by a processor or processing system, or by any suitable means for carrying out the described functions.

At block 1302, the UE may obtain a respective beam quality metric for each transmit beam of a plurality of transmit beams associated with a radio access network (RAN) entity. In some examples, the beam quality metric may include at least one of a reference signal received power (RSRP) or a signal-to-interference-plus-noise ratio (SINR). In some examples, the UE may receive a respective beam reference signal (e.g., SSB or CSI-RS) on each of the plurality of transmit beams, and the respective beam quality metric for each of the plurality of transmit beams is obtained based on the respective beam reference signal. In some examples, each of the plurality of transmit beams corresponds to one of a plurality of transmission and reception points (TRPs) associated with the RAN entity.

In some examples, the UE may, for each of the plurality of transmit beams, obtain a respective individual beam quality metric on each receive beam of a plurality of receive beams on the UE during a measurement period to produce a respective beam quality metric vector. In some examples, each of the plurality of receive beams is associated with a respective one of a plurality of antenna panels on the UE. In some examples, the beam quality metric includes the RSRP and each of the respective beam quality metric vectors includes an RSRP vector. The RSRP vectors for each of the plurality of transmit beams may indicate a respective mutual interference between each of the plurality of transmit beams.

In some examples, the UE may receive the plurality of transmit beams during a beam refinement (e.g., P2) procedure or other subsequent beam management procedure. In some examples, each of the plurality of transmit beams is associated with a frequency band selected from FR2, FR4-a, FR4-1, FR4, or FR5. For example, the beam manager circuitry 1244, together with the communication and processing circuitry 1242, transceiver 1210, and antenna array(s) 1230, shown and described above in connection with FIG. 12, may provide a means to obtain the respective beam quality metric for each transmit beam.

At block 1304, the UE may transmit, to the RAN entity, a beam report indicating a plurality of beam groups based on the respective beam quality metrics. Each of the plurality of beam groups includes two or more of the plurality of transmit beams. In some examples, the beam report includes the respective beam quality metric vector for each of the plurality of transmit beams. In some examples, the beam report includes the plurality of beam groups. In this example, the UE may further identify the plurality of beam groups based on the respective beam quality metrics (e.g., the beam quality metric vectors). In some examples, the beam report may include an L1 measurement report. For example, the beam manager circuitry 1244, together with the communication and processing circuitry 1242, the TCI state manager circuitry 1246, the transceiver 1210 and antenna array 1230 shown and described above in connection with FIG. 12 may provide a means to transmit the beam report to the RAN entity.

At block 1306, the UE may receive, from the RAN entity, a plurality of transmission configuration indicator (TCI) state groups. Each of the plurality of TCI state groups corresponding to a respective one of the plurality of beam groups. In some examples, the UE may receive a radio resource control (RRC) configuration of the plurality of TCI state groups.

In some examples, the UE may further receive a plurality of TCI states, each associated with a respective one of the plurality of transmit beams. Each of the plurality of TCI state groups can include a respective one of the plurality of TCI states for each of the plurality of transmit beams within the respective one of the plurality of beam groups. For example, the UE may receive, from the RAN entity, a radio resource control (RRC) configuration of the plurality of TCI states. In some examples, the UE may further obtain a respective initial beam quality metric for each of the plurality of transmit beams and transmit, to the RAN entity, an initial beam report including the respective initial beam quality metric of at least one transmit beam of the plurality of transmit beams. The UE may then receive, from the RAN entity, the plurality of TCI states in response to the initial beam report. For example, the TCI state manager circuitry 1246, together with the communication and processing circuitry 1242, the transceiver 1210, and the antenna array 1230, shown and described above in connection with FIG. 12 may provide a means to receive the plurality of TCI state groups.

Figure 14:
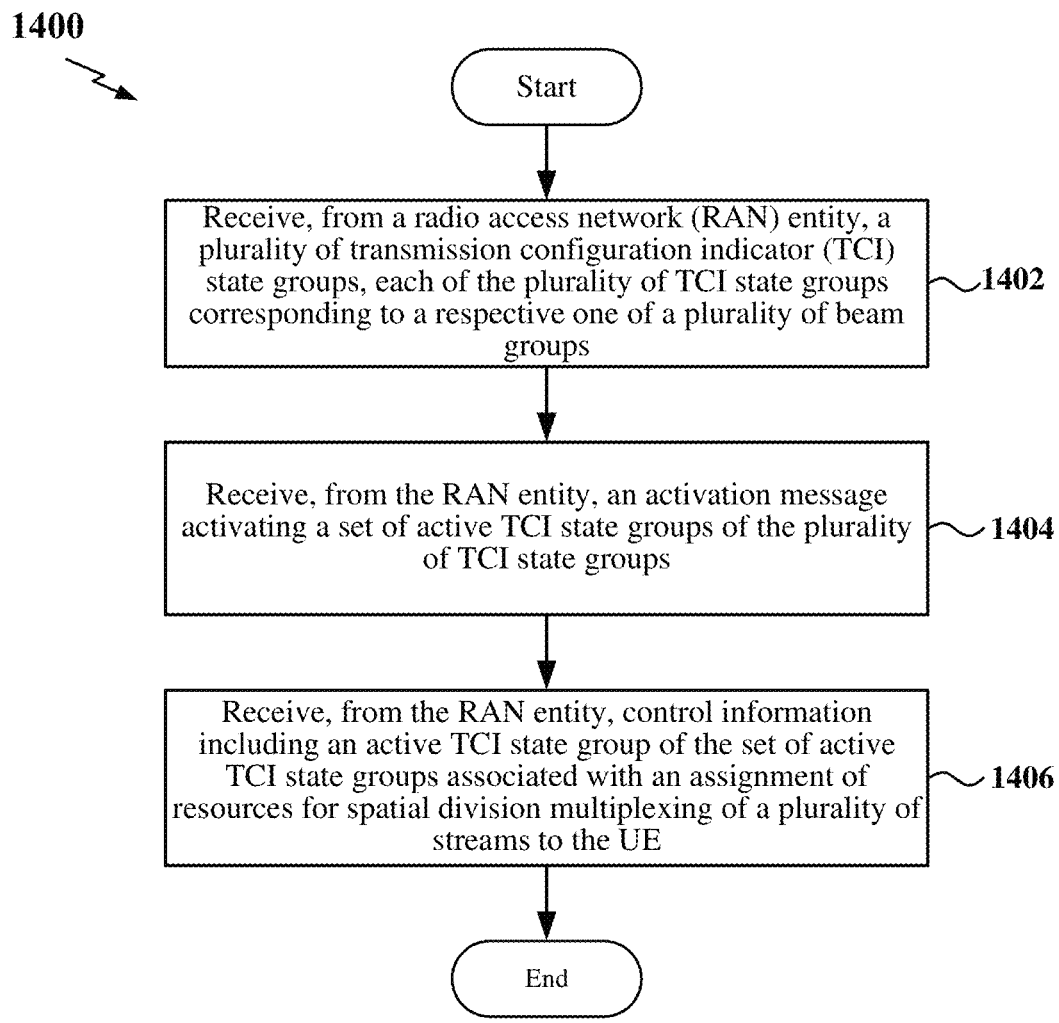
FIG. 14 is a flow chart of another exemplary method for TCI state management for multi-stream communication at a UE according to some aspects.

FIG. 14 is a flow chart 1400 illustrating another example of a method for TCI state management for multi-stream communication at a UE according to some aspects. As described below, some or all illustrated features may be omitted in a particular implementation within the scope of the present disclosure, and some illustrated features may not be required for implementation of all aspects. In some examples, the method may be performed by the UE 1200, as described above and illustrated in FIG. 12, by a processor or processing system, or by any suitable means for carrying out the described functions.

At block 1402, the UE may receive, from a radio access network (RAN) entity, a plurality of transmission configuration indicator (TCI) state groups. Each of the plurality of TCI state groups corresponding to a respective one of a plurality of beam groups. In some examples, the UE may receive a radio resource control (RRC) configuration of the plurality of TCI state groups. In some examples, each of the plurality of beam groups includes two or more of a plurality of transmit beams associated with the RAN entity. In some examples, each of the plurality of transmit beams corresponds to one of a plurality of transmission and reception points (TRPs) associated with the RAN entity. In some examples, each of the plurality of transmit beams is associated with a frequency band selected from FR2, FR4-a, FR4-1, FR4, or FR5.

In some examples, the UE may further receive a plurality of TCI states, each associated with a respective one of the plurality of transmit beams. Each of the plurality of TCI state groups can include a respective one of the plurality of TCI states for each of the plurality of transmit beams within the respective one of the plurality of beam groups. For example, the UE may receive, from the RAN entity, a radio resource control (RRC) configuration of the plurality of TCI states. For example, the TCI state manager circuitry 1246, together with the communication and processing circuitry 1242, the transceiver 1210, and the antenna array 1230, shown and described above in connection with FIG. 12 may provide a means to receive the plurality of TCI state groups.

At block 1404, the UE may receive, from the RAN entity, an activation message activating a set of active TCI state groups of the plurality of TCI state groups. In some examples, the activation message includes a medium access control-control element (MAC-CE). In some examples, the set of active TCI state groups includes up to eight of the plurality of TCI state groups. For example, the TCI state manager circuitry 1246, together with the communication and processing circuitry 1242, the transceiver 1210, and the antenna array 1230, shown and described above in connection with FIG. 12 may provide a means to receive the activation message.

At block 1406, the UE may receive, from the RAN entity, control information including an active TCI state group of the set of active TCI state groups associated with an assignment of resources for spatial division multiplexing of a plurality of streams to the UE. In some examples, the control information includes three bits indicating the active TCI state group. In some examples, the UE may further receive each of the plurality of streams from a different respective one of the plurality of TRPs using an active beam group of the plurality of beam groups associated with the active TCI state group. For example, the TCI state manager circuitry 1246, together with the communication and processing circuitry 1242, the transceiver 1210, and the antenna array 1230 shown and described above in connection with FIG. 12 may provide a means to receive the control information including an active TCI state group.

In one configuration, the UE 1200 includes means for performing the various functions and processes described in relation to FIGS. 13 and 14. In one aspect, the aforementioned means may be the processor 1204 shown in FIG. 12 configured to perform the functions recited by the aforementioned means. In another aspect, the aforementioned means may be a circuit or any apparatus configured to perform the functions recited by the aforementioned means.

Of course, in the above examples, the circuitry included in the processor 1204 is merely provided as an example, and other means for carrying out the described functions may be included within various aspects of the present disclosure, including but not limited to the instructions stored in the computer-readable storage medium 1206, or any other suitable apparatus or means described in any one of the FIG. 1, 3-6, 8, or 9, and utilizing, for example, the processes and/or algorithms described herein in relation to FIGS. 13 and 14.

Figure 15:
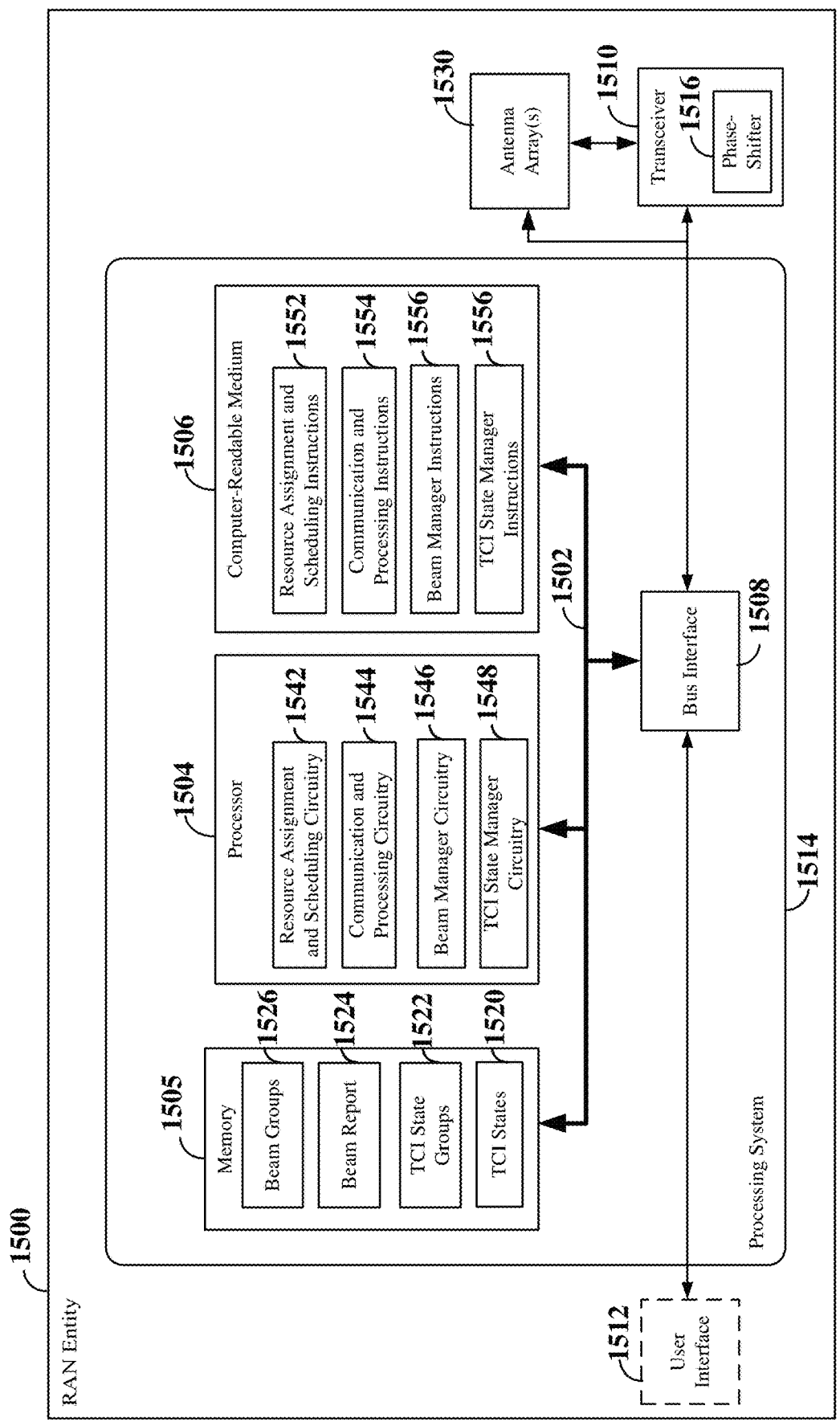
FIG. 15 is a block diagram illustrating an example of a hardware implementation for a radio access network (RAN) entity employing a processing system according to some aspects.

FIG. 15 is a conceptual diagram illustrating an example of a hardware implementation for an exemplary RAN entity 1500 employing a processing system 1514. For example, the RAN entity 1500 may correspond to any of the base stations (e.g., gNBs), TRPs (e.g., combined TRP and base station in a RRH configuration), or other scheduling entities illustrated in any one or more of FIG. 1, 3-6, 8, or 9.

In accordance with various aspects of the disclosure, an element, or any portion of an element, or any combination of elements may be implemented with a processing system 1514 that includes one or more processors 1504. The processing system 1514 may be substantially the same as the processing system 1114 illustrated in FIG. 11, including a bus interface 1508, a bus 1502, memory 1505, a processor 1504, and a computer-readable medium 1506. Furthermore, the RAN entity 1500 may include an optional user interface 1512 and a transceiver 1510 substantially similar to those described above in FIG. 11. In some examples, the transceiver 1510 may include a phase-shifter 1516 for digital and/or analog beamforming via one or more antenna array(s) 1530. The processor 1504, as utilized in a RAN entity 1500, may be used to implement any one or more of the processes described below.

In some aspects of the disclosure, the processor 1504 may include circuitry configured for various functions. For example, the processor 1504 may include resource assignment and scheduling circuitry 1542, configured to generate, schedule, and modify a resource assignment or grant of time-frequency resources (e.g., a set of one or more resource elements). For example, the resource assignment and scheduling circuitry 1542 may schedule time-frequency resources within a plurality of time division duplex (TDD) and/or frequency division duplex (FDD) subframes, slots, and/or mini-slots to carry user data traffic and/or control information to and/or from multiple UEs.

In some examples, the resource assignment and scheduling circuitry 1542 may be configured to schedule resources for the transmission of a plurality of transmit beams, each carrying a beam reference signal, from a plurality of TRPs associated with the RAN entity 1500. For example, the transmit beams may be scheduled during a beam refinement procedure or other beam management procedure in which a beam report 1524 may be received from a UE. The resource assignment and scheduling circuitry 1542 may schedule at least one transmit beam from each TRP or from a subset of the TRPs (e.g., active TRPs for the UE). The resource assignment and scheduling circuitry 1542 may further be configured to schedule transmission by the UE of the beam report 1524 to the RAN entity 1500. In addition, the resource assignment and scheduling circuitry 1542 may be configured to schedule transmission of multiple spatially division multiplexed data streams, each from a respective TRP, to the UE.

The resource assignment and scheduling circuitry 1542 may further be configured to schedule resources for the transmission of an RRC configuration of TCI states to a UE, the transmission of an RRC configuration of TCI state groups to a UE, the transmission of an activation message (e.g., MAC-CE) activating a set of active TCI state groups to the UE, and the transmission of control information (e.g., DCI) including an active TCI state group selected for the transmission of the multiple spatially division multiplexed data streams. The resource assignment and scheduling circuitry 1542 may further be configured to execute resource assignment and scheduling software 1552 stored in the computer-readable medium 1506 to implement one or more of the functions described herein.

The processor 1504 may further include communication and processing circuitry 1544, configured to communicate with the UE. In some examples, the communication and processing circuitry 1544 may include one or more hardware components that provide the physical structure that performs processes related to wireless communication (e.g., signal reception and/or signal transmission) and signal processing (e.g., processing a received signal and/or processing a signal for transmission).

In some examples, the communication and processing circuitry 1544 may be configured to receive and process uplink beamformed signals at a mmWave frequency or a sub-6 GHz frequency via the transceiver 1510 and the antenna array 1530 (e.g., using the phase-shifter 1516). In addition, the communication and processing circuitry 1544 may be configured to generate and transmit uplink beamformed signals at a mmWave frequency or a sub-6 GHz frequency via the transceiver 1510 and antenna array 1530 (e.g., using the phase-shifter 1516). For example, the communication and processing circuitry 1544 may be configured for multi-stream communication with the UE entity via spatial division multiplexing (SDM) of the multiple streams on corresponding multiple beam pair links (BPLs) between the UE and respective TRPs of the RAN entity 1500.

The communication and processing circuitry 1544 may further be configured to transmit a plurality of transmit beams from a plurality of TRPs of the RAN entity 1500 via the antenna arrays 1530 and transceiver 1510. Each of the transmit beams may carry a respective beam reference signal (e.g., an SSB or CSI-RS). The communication and processing circuitry 1544 may further be configured to receive a beam report 1524 (e.g., an L1 measurement report) from the UE. The beam report 1524 may further be stored, for example, in memory 1505. The communication and processing circuitry 1544 may further be configured to transmit the plurality of TCI states (e.g., the RRC configuration of the plurality of TCI states), the plurality of TCI state groups (e.g., the RRC configuration of the plurality of TCI state groups), the activation message (e.g., the MAC-CE) activating a set of active TCI state groups of the plurality of TCI state groups, and the control information (e.g., DCI) including the active TCI state group selected for SDM of the multiple streams to the UE. The communication and processing circuitry 1544 may further be configured to execute communication and processing software 1554 stored in the computer-readable medium 1506 to implement one or more of the functions described herein.

The processor 1504 may further include beam manager circuitry 1546, configured to perform beam management for SDM multi-stream communication. The beam manager circuitry 1546 may be configured to perform beam management for SDM multi-stream communication during a beam refinement procedure (e.g., P2 procedure) or other beam management procedure in which a beam report is generated. The beam manager circuitry 1546 may be configured to operate together with the resource assignment and scheduling circuitry 1542 and communication and processing circuitry 1544 to generate and transmit the plurality of transmit beams to the UE. The beam manager circuitry 1546 may further be configured to receive a beam report 1524 from the UE.

In some examples, the beam report 1524 may include a beam quality metric (e.g., RSRP) of one or more of the transmit beams. For example, the beam report 1524 may include the beam quality metric of the transmit beam(s) having the highest RSRP. In this example, the beam quality metrics may include initial beam quality metrics obtained, for example, during a P2 procedure, and the beam report 1524 may correspond to an initial beam report.

In other examples, the beam report 1524 may include an indication of a plurality of beam groups 1526. The beam report 1524 including the indication of the plurality of beam groups 1526 may be generated during the P2 procedure or other subsequent beam management procedure. In examples in which the beam report 1524 is generated during a P2 procedure, the beam report 1524 includes the indication of the plurality of beam groups 1526 instead of the individual beam quality metric(s) of one or more transmit beams. In some examples, the indication of the plurality of beam groups may include the plurality of beam groups. In other examples, the indication of the plurality of beam groups may include a respective beam quality metric vector for each of the plurality of transmit beams. Each beam quality metric vector may include a respective beam quality metric obtained during a respective measurement period in parallel or serially on each of a plurality of receive beams of the UE. For example, the beam quality metric vectors may include RSRP vectors. The beam manager circuitry 1546 may further be configured to execute beam manager instructions 1556 (e.g., software) stored in the computer-readable medium 1506 to implement one or more of the functions described herein.

The processor 1504 may further include TCI state manager circuitry 1548, configured to manage TCI states 1520 and TCI state groups 1522 for a UE. The TCI state manager circuitry 1548 may correspond, for example, to any of the RAN entity TCI state managers shown in FIGS. 1 and/or 3-6.

In some examples, the TCI state manager circuitry 1548 may be configured to configure a plurality of TCI states 1520 for the UE and to transmit the plurality of TCI states 1520 to the UE via the communication and processing circuitry 1544, the transceiver 1510, and the antenna array 1530. The TCI state manager circuitry 1548 may further be configured to store the plurality of TCI states 1520 within, for example, memory 1505. In some examples, the TCI state manager circuitry 1548 may be configured to transmit an RRC configuration of the plurality of TCI states 1520. The RRC configuration may include, for example, an RRC TCI states table including each of the TCI states 1520 configured for the UE.

The TCI state manager circuitry 1548 may be configured to configure the TCI states 1520 for the UE based on a beam report 1524 received from the UE during, for example, a P2 procedure or other beam management procedure. In some examples, the beam report may be the initial beam report including initial beam quality metrics (e.g., the beam quality metric of the transmit beam(s) having the highest RSRP). In other examples, the beam report 1524 may be an enhanced beam report including a respective beam quality metric vector for each of the plurality of transmit beams.

The TCI state manager circuitry 1548 may further be configured to group the plurality of transmit beams into a plurality of beam groups 1526. The beam groups 1526 may be stored, for example, in memory 1505. Each transmit beam of the plurality of transmit beams may correspond to a respective one of a plurality of TRPs associated with the RAN entity. Each of the plurality of beam groups 1526 may include a single transmit beam from each of two or more of the TRPs for multi-stream communication.

The TCI state manager circuitry 1548 may group the plurality of transmit beams into the plurality of beam groups 1526 based on a beam report 1524. In some examples, the beam report 1524 may be the same beam report utilized to configure the plurality of TCI states (e.g., the beam report 1524 received during the P2 procedure) or a subsequently received beam report 1524 during a subsequent beam management procedure. In some examples, the beam report 1524 may include the plurality of beam groups 1526 and the TCI state manager circuitry 1548 may group the transmit beams into the plurality of beam groups 1526 in accordance with the beam groups included in the beam report 1524. In other examples, the beam report 1524 may include a respective beam quality metric vector for each of the plurality of transmit beams. For example, from the beam quality metric vectors, the TCI state manager 1548 may group the transmit beams into the beam groups 1526 such that each beam group 1526 includes a respective transmit beam associated with each of two or more of the TRPs of the multi-TRP RAN entity 1500 that have minimal mutual interference (e.g., minimum inter-beam interference) therebetween. In an example, the selected transmit beams for a particular beam group have the highest RSRP that are also associated with BPLs that have the minimum inter-beam interference experienced at the UE.

The TCI state manager circuitry 1548 may then configure a plurality of TCI state groups 1522 for the UE, each corresponding to a different respective beam group 1526, and transmit the TCI state groups 1522 to the UE via the communication and processing circuitry 1544, the transceiver 1510, and the antenna array 1530. The TCI state manager circuitry 1548 may further be configured to store the plurality of TCI state groups 1522 within, for example, memory 1505. In some examples, the TCI state manager circuitry 1548 may transmit an RRC configuration of the plurality of TCI state groups 1522. The RRC configuration may include, for example, an RRC TCI state groups table including each of the TCI state groups 1522 configured for the UE. Each TCI state group 1522 may include, for example, a respective TCI state group identifier and a list of the TCI states 1520 (e.g., previously configured TCI states for the UE) included within the respective TCI state group for each of the TCI state groups 1522.

The TCI state manager circuitry 1548 may further be configured to transmit an activation or deactivation message for one or more of the plurality of TCI state groups 1522. The activation or deactivation message may be, for example, a MAC-CE. In some examples, the TCI state manager circuitry 1548 may be configured to transmit an activation message that activates a set of active TCI state groups. In some examples, the set of active TCI state groups includes up to eight active TCI state groups that may be selected from for multi-stream PDSCH transmissions. The TCI state manager circuitry 1548 may select the active TCI state groups based on, for example, a mobility pattern of the UE.

The TCI state manager circuitry 1548 may further be configured to transmit control information (e.g., DCI) including a selected active TCI state group for a multi-stream PDSCH communication. The control information may further include scheduling information scheduling the multi-stream PDSCH communication. In some examples, the DCI may include a plurality of bits indicating the selected TCI state group for the multi-stream PDSCH communication. For example, the DCI may include three bits indicating the selected TCI state group. The TCI state manager circuitry 1548 may further operate in coordination with the communication and processing circuitry 1544 and beam manager circuitry 1546 to transmit the SDM multi-stream PDSCH communication utilizing the selected active TCI state. The TCI state manager circuitry 1548 may further be configured to execute TCI state manager instructions 1556 (e.g., software) stored in the computer-readable medium 1506 to implement one or more of the functions described herein.

Figure 16:
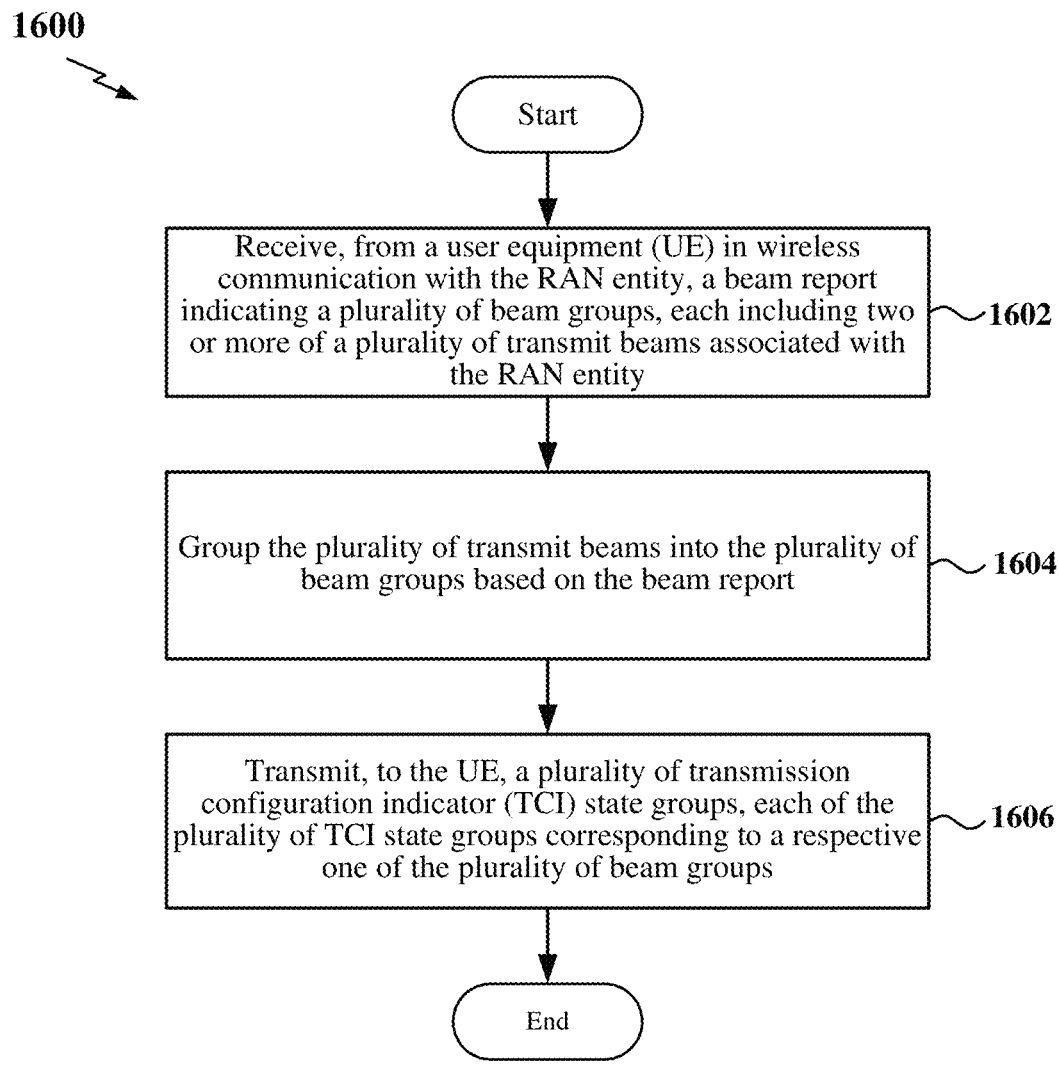
FIG. 16 is a flow chart of an exemplary method for TCI state management for multi-stream communication at a RAN entity according to some aspects.

FIG. 16 is a flow chart 1600 illustrating an example of a method for TCI state management for multi-stream communication at a radio access network (RAN) entity according to some aspects. As described below, some or all illustrated features may be omitted in a particular implementation within the scope of the present disclosure, and some illustrated features may not be required for implementation of all aspects. In some examples, the method may be performed by the RAN entity 1500, as described above and illustrated in FIG. 15, by a processor or processing system, or by any suitable means for carrying out the described functions.

At block 1602, the RAN entity may receive, from a user equipment (UE) in wireless communication with the RAN entity, a beam report indicating a plurality of beam groups, each including two or more of a plurality of transmit beams associated with the RAN entity. In some examples, each of the plurality of transmit beams corresponds to one of a plurality of transmission and reception points (TRPs) associated with the RAN entity. In some examples, the beam report includes a respective beam quality metric vector (e.g., an RSRP vector) for each of the plurality of transmit beams. For example, each of the respective beam quality metric vectors may include a respective individual beam quality metric obtained on each receive beam of a plurality of receive beams on the UE during a measurement period. In some examples, the beam report includes the plurality of beam groups. In some examples, the beam report may include an L1 measurement report. In some examples, each of the plurality of transmit beams is associated with a frequency band selected from FR2, FR4-a, FR4-1, FR4, or FR5. For example, the beam manager circuitry 1546, together with the communication and processing circuitry 1544, transceiver 1510, and antenna array(s) 1530, shown and described above in connection with FIG. 15, may provide a means to receive the beam report from the UE.

At block 1604, the RAN entity may group the plurality of transmit beams into the plurality of beam groups based on the beam report. In examples in which the beam report includes the beam groups, the RAN entity may group the plurality of transmit beams into the plurality of beam groups in accordance with the plurality of beam groups included in the beam report. In examples in which the beam report includes a respective beam quality metric vector for each of the plurality of transmit beams, the RAN entity may group the plurality of transmit beams into the plurality of beam groups based on the beam quality metric vectors. For example, the TCI state manager circuitry 1548 shown and described above in connection with FIG. 15, may provide a means to group the transmit beams into beam groups.

At block 1606, the RAN entity may transmit, to the UE, a plurality of transmission configuration indicator (TCI) state groups. Each of the plurality of TCI state groups corresponding to a respective one of the plurality of beam groups. In some examples, the RAN entity may transmit a radio resource control (RRC) configuration of the plurality of TCI state groups.

In some examples, the RAN entity may further transmit, to the UE, a plurality of TCI states, each associated with a respective one of the plurality of transmit beams. Each of the plurality of TCI state groups can include a respective one of the plurality of TCI states for each of the plurality of transmit beams within the respective one of the plurality of beam groups. For example, the RAN entity may transmit, to the UE, a radio resource control (RRC) configuration of the plurality of TCI states. In some examples, the RAN entity may further receive, from the UE, an initial beam report including a respective initial beam quality metric of at least one transmit beam of the plurality of transmit beams and transmit, to the UE, the plurality of TCI states in response to the initial beam report. For example, the TCI state manager circuitry 1548, together with the communication and processing circuitry 1544, the transceiver 1510, and the antenna array 1530, shown and described above in connection with FIG. 15 may provide a means to transmit the plurality of TCI state groups.

Figure 17:
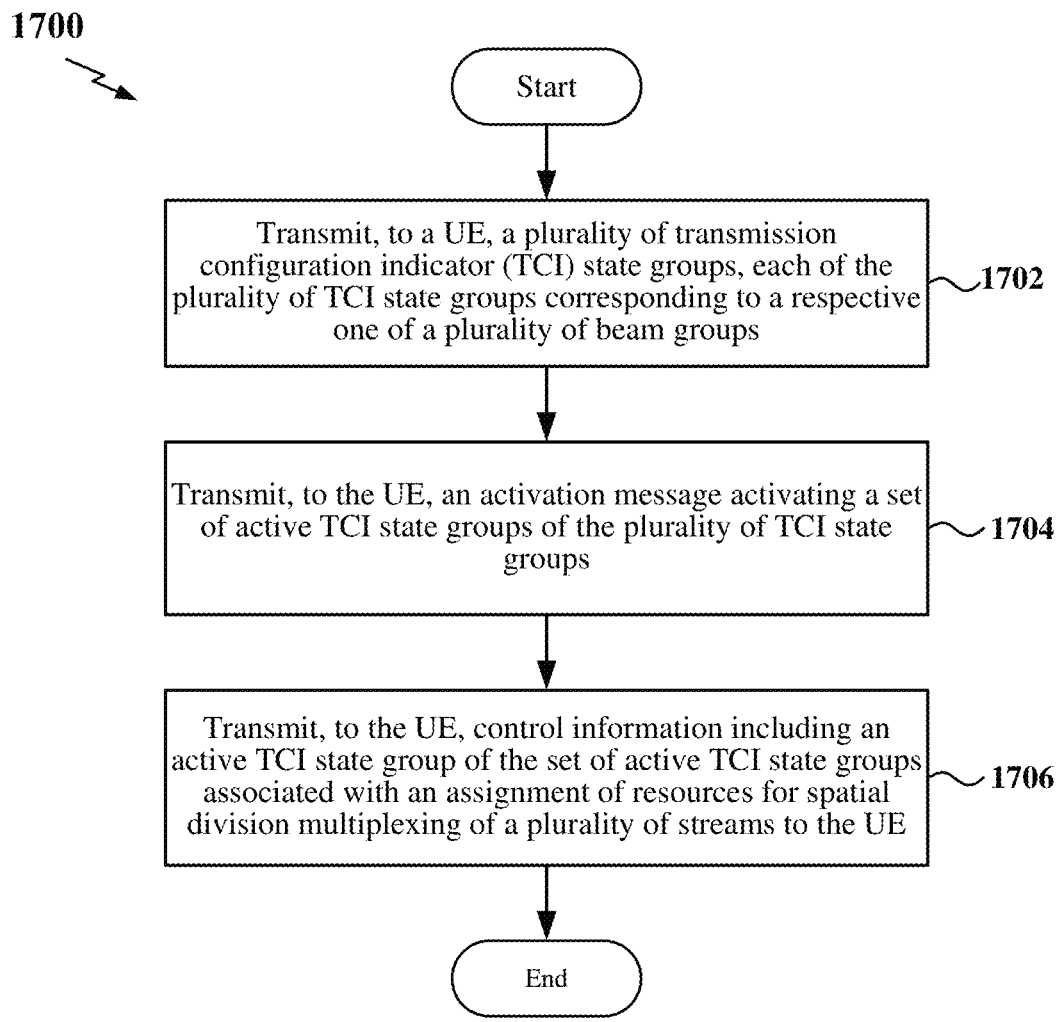
FIG. 17 is a flow chart of another exemplary method for TCI state management for multi-stream communication at a RAN entity according to some aspects.

FIG. 17 is a flow chart 1700 illustrating another example of a method for TCI state management for multi-stream communication at a RAN entity according to some aspects. As described below, some or all illustrated features may be omitted in a particular implementation within the scope of the present disclosure, and some illustrated features may not be required for implementation of all aspects. In some examples, the method may be performed by the RAN entity 1500, as described above and illustrated in FIG. 15, by a processor or processing system, or by any suitable means for carrying out the described functions.

At block 1702, the RAN entity may transmit, to a UE, a plurality of transmission configuration indicator (TCI) state groups. Each of the plurality of TCI state groups corresponding to a respective one of a plurality of beam groups. In some examples, the RAN entity may transmit a radio resource control (RRC) configuration of the plurality of TCI state groups. In some examples, each of the plurality of beam groups includes two or more of a plurality of transmit beams associated with the RAN entity. In some examples, each of the plurality of transmit beams corresponds to one of a plurality of transmission and reception points (TRPs) associated with the RAN entity. In some examples, each of the plurality of transmit beams is associated with a frequency band selected from FR2, FR4-a, FR4-1, FR4, or FR5.

In some examples, the RAN entity may further transmit, to the UE, a plurality of TCI states, each associated with a respective one of the plurality of transmit beams. Each of the plurality of TCI state groups can include a respective one of the plurality of TCI states for each of the plurality of transmit beams within the respective one of the plurality of beam groups. For example, the RAN entity may transmit, to the UE, a radio resource control (RRC) configuration of the plurality of TCI states. For example, the TCI state manager circuitry 1548, together with the communication and processing circuitry 1544, the transceiver 1510, and the antenna array 1530, shown and described above in connection with FIG. 15 may provide a means to transmit the plurality of TCI state groups.

At block 1704, the RAN entity may transmit, to the UE, an activation message activating a set of active TCI state groups of the plurality of TCI state groups. In some examples, the activation message includes a medium access control-control element (MAC-CE). In some examples, the set of active TCI state groups includes up to eight of the plurality of TCI state groups. For example, the TCI state manager circuitry 1548, together with the communication and processing circuitry 1544, the transceiver 1510, and the antenna array 1530, shown and described above in connection with FIG. 15 may provide a means to transmit the activation message.

At block 1706, the RAN entity may transmit, to the UE, control information including an active TCI state group of the set of active TCI state groups associated with an assignment of resources for spatial division multiplexing of a plurality of streams to the UE. In some examples, the control information includes three bits indicating the active TCI state group. In some examples, the RAN entity may further transmit each of the plurality of streams from a different respective one of the plurality of TRPs using an active beam group of the plurality of beam groups associated with the active TCI state group. For example, the TCI state manager circuitry 1548, together with the communication and processing circuitry 1544, the transceiver 1510, and the antenna array 1530, shown and described above in connection with FIG. 15 may provide a means to transmit the control information including an active TCI state group.

In one configuration, the RAN entity 1500 includes means for performing the various functions and processes described in relation to FIGS. 16 and 17. In one aspect, the aforementioned means may be the processor 1504 shown in FIG. 15 configured to perform the functions recited by the aforementioned means. In another aspect, the aforementioned means may be a circuit or any apparatus configured to perform the functions recited by the aforementioned means.

Of course, in the above examples, the circuitry included in the processor 1504 is merely provided as an example, and other means for carrying out the described functions may be included within various aspects of the present disclosure, including but not limited to the instructions stored in the computer-readable storage medium 1506, or any other suitable apparatus or means described in any one of the FIG. 1, 3-6, 8, or 9, and utilizing, for example, the processes and/or algorithms described herein in relation to FIGS. 16 and 17.

The following provides an overview of aspects of the present disclosure:

Aspect 1: A method for wireless communication at a user equipment (UE) in a wireless communication network, the method comprising: obtaining a respective beam quality metric for each transmit beam of a plurality of transmit beams associated with a radio access network (RAN) entity; transmitting, to the RAN entity, a beam report indicating a plurality of beam groups based on the respective beam quality metrics, each of the plurality of beam groups comprising two or more of the plurality of transmit beams; and receiving, from the RAN entity, a plurality of transmission configuration indicator (TCI) state groups, each of the plurality of TCI state groups corresponding to a respective one of the plurality of beam groups.

Aspect 2: The method of aspect 1, wherein the receiving, from the RAN entity, the at least one TCI state group further comprises: receiving, from the RAN entity, a radio resource control (RRC) configuration of the plurality of TCI state groups.

Aspect 3: The method of aspect 1 or 2, further comprising: receiving, from the RAN entity, an activation message activating a set of active TCI state groups of the plurality of TCI state groups.

Aspect 4: The method of aspect 3, wherein the activation message comprises a medium access control-control element (MAC-CE).

Aspect 5: The method of aspect 3 or 4, wherein the set of active TCI state groups comprises up to eight of the plurality of TCI state groups.

Aspect 6: The method of any of aspects 1 through 5, further comprising: receiving, from the RAN entity, control information comprising an active TCI state group of the set of active TCI state groups associated with an assignment of resources for spatial division multiplexing of a plurality of streams to the UE.

Aspect 7: The method of aspect 6, wherein each of the plurality of transmit beams corresponds to one of a plurality of transmission and reception points (TRPs) associated with the RAN entity, and further comprising: receiving each of the plurality of streams from a different respective one of the plurality of TRPs using an active beam group of the plurality of beam groups associated with the active TCI state group.

Aspect 8: The method of aspect 6 or 7, wherein the control information comprises three bits indicating the active TCI state group.

Aspect 9: The method of any of aspects 1 through 8, further comprising: receiving a plurality of TCI states, each associated with a respective one of the plurality of transmit beams, each of the plurality of TCI state groups comprises a respective one of the plurality of TCI states for each of the plurality of transmit beams within the respective one of the plurality of beam groups.

Aspect 10: The method of aspect 9, wherein the receiving the plurality of TCI states further comprises: receiving, from the RAN entity, a radio resource control (RRC) configuration of the plurality of TCI states.

Aspect 11: The method of aspect 9 or 10, further comprising: obtaining a respective initial beam quality metric for each of the plurality of transmit beams; and transmitting, to the RAN entity, an initial beam report comprising the respective initial beam quality metric of at least one transmit beam of the plurality of transmit beams.

Aspect 12: The method of aspect 11, wherein the receiving, from the RAN entity, the plurality of TCI states further comprises: receiving, from the RAN entity, the plurality of TCI states in response to the initial beam report.

Aspect 13: The method of any of aspects 1 through 12, wherein the obtaining the respective beam quality metric for each transmit beam of the plurality of transmit beams comprises: for each of the plurality of transmit beams, obtaining a respective individual beam quality metric on each receive beam of a plurality of receive beams on the UE during a measurement period to produce a respective beam quality metric vector, wherein the beam report comprises the respective beam quality metric vector for each of the plurality of transmit beams.

Aspect 14: The method of any of aspects 1 through 13, wherein the transmitting, to the RAN entity, the beam report indicating a plurality of beam groups further comprises: identifying the plurality of beam groups based on the respective beam quality metrics; and including the plurality of beam groups within the beam report.

Aspect 15: The method of any of aspects 1 through 14, wherein each of the plurality of transmit beams is associated with a frequency band selected from FR2, FR4, FR4-a, FR4-1, or FR5.

Aspect 16: A user equipment (UE) configured for wireless communication comprising a processor, and a memory coupled to the processor, the processor and memory configured to perform a method of any one of aspects 1 through 15.

Aspect 17: A method for wireless communication at a radio access network (RAN) entity in a wireless communication network, the method comprising: receiving, from a user equipment (UE) in wireless communication with the RAN entity, a beam report indicating a plurality of beam groups, each comprising two or more of a plurality of transmit beams associated with the RAN entity; and transmitting, to the UE, a plurality of transmission configuration indicator (TCI) state groups, each of the plurality of TCI state groups corresponding to a respective one of the plurality of beam groups.

Aspect 18: The method of aspect 17, wherein the transmitting, to the UE, the at least one TCI state group further comprises: transmitting, to the UE, a radio resource control (RRC) configuration of the plurality of TCI state groups.

Aspect 19: The method of aspect 17 or 18, further comprising: transmitting, to the UE, an activation message activating a set of active TCI state groups of the plurality of TCI state groups.

Aspect 20: The method of aspect 19, wherein the activation message comprises a medium access control-control element (MAC-CE).

Aspect 21: The method of aspect 19 or 20, wherein the set of active TCI state groups comprises up to eight of the plurality of TCI state groups.

Aspect 22: The method of any of aspects 17 through 21, further comprising: transmitting, to the UE, control information comprising an active TCI state group of the set of active TCI state groups associated with an assignment of resources for spatial division multiplexing of a plurality of streams to the UE.

Aspect 23: The method of aspect 22, wherein each of the plurality of transmit beams corresponds to one of a plurality of transmission and reception points (TRPs) associated with the RAN entity, and further comprising: transmitting each of the plurality of streams from a different respective one of the plurality of TRPs using an active beam group of the plurality of beam groups associated with the active TCI state group.

Aspect 24: The method of aspect 22 or 23, wherein the control information comprises three bits indicating the active TCI state group.

Aspect 25: The method of any of aspects 17 through 24, further comprising: transmitting a plurality of TCI states, each associated with a respective one of the plurality of transmit beams, wherein each of the plurality of TCI state groups comprises a respective one of the plurality of TCI states for each of the plurality of transmit beams within the respective one of the plurality of beam groups.

Aspect 26: The method of aspect 25, wherein the transmitting the plurality of TCI states further comprises: receiving, from the UE, an initial beam report comprising a respective initial beam quality metric of at least one transmit beam of the plurality of transmit beams; and transmitting, to the UE, the plurality of TCI states in response to the initial beam report.

Aspect 27: The method of any of aspects 17 through 26, wherein the beam report comprises a respective beam quality metric vector for each of the plurality of transmit beams, each of the respective beam quality metric vectors comprising a respective individual beam quality metric obtained on each receive beam of a plurality of receive beams on the UE during a measurement period, and further comprising: grouping the plurality of transmit beams into the plurality of beam groups based on the respective beam quality metric vectors.

Aspect 28: The method of any of aspects 17 through 27, wherein the beam report comprises the plurality of beam groups, and further comprising: grouping the plurality of transmit beams into the plurality of beam groups in accordance with the plurality of beam groups included within the beam report.

Aspect 29: A radio access network (RAN) entity configured for wireless communication comprising a processor, and a memory coupled to the processor, the processor and memory configured to perform a method of any one of aspects 17 through 28.

Aspect 30: An apparatus configured for wireless communication comprising at least one means for performing a method of any one of aspects 1 through 15 or 17 through 28.

Aspect 31: A non-transitory computer-readable medium storing processor-executable code, comprising code for causing an apparatus to perform a method of any one of aspects 1 through 15 or 17 through 28.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-17 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 3-6, 8, 9, 12, and/or 15 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication at a user equipment (UE) in a wireless communication network, the method comprising:
   for each transmit beam of a plurality of transmit beams associated with a network entity, obtaining a respective individual beam quality metric on each receive beam of a plurality of receive beams on the UE during a measurement period to produce a respective beam quality metric vector for each of the plurality of transmit beams, each beam quality metric vector comprising the respective individual beam quality metrics obtained for each of the plurality of receive beams;
   transmitting, to the network entity, a beam report comprising the respective beam quality metric vector for each of the plurality of transmit beams, the beam report indicating a plurality of beam groups based on the respective beam quality metric vectors, each of the plurality of beam groups comprising two or more of the plurality of transmit beams having a minimum mutual interference therebetween based on the respective beam quality metric vectors; and
   receiving, from the network entity, a plurality of transmission configuration indicator (TCI) state groups, each of the plurality of TCI state groups corresponding to a respective one of the plurality of beam groups.

2. The method of claim 1, wherein the receiving, from the network entity, the plurality of TCI state groups further comprises:
   receiving, from the network entity, a radio resource control (RRC) configuration of the plurality of TCI state groups.

3. The method of claim 1, further comprising:
   receiving, from the network entity, an activation message activating a set of active TCI state groups of the plurality of TCI state groups.

4. The method of claim 3, wherein the activation message comprises a medium access control-control element (MAC-CE).

5. The method of claim 3, wherein the set of active TCI state groups comprises up to eight of the plurality of TCI state groups.

6. The method of claim 3, further comprising:
   receiving, from the network entity, control information comprising an active TCI state group of the set of active TCI state groups associated with an assignment of resources for spatial division multiplexing of a plurality of streams to the UE.

7. The method of claim 6, wherein each of the plurality of transmit beams corresponds to one of a plurality of transmission and reception points (TRPs) associated with the network entity, and further comprising:
receiving each of the plurality of streams from a different respective one of the plurality of TRPs using an active beam group of the plurality of beam groups associated with the active TCI state group.

8. The method of claim 6, wherein the control information comprises three bits indicating the active TCI state group.

9. The method of claim 1, further comprising:
receiving a plurality of TCI states, each associated with a respective one of the plurality of transmit beams, each of the plurality of TCI state groups comprises a respective one of the plurality of TCI states for each of the plurality of transmit beams within the respective one of the plurality of beam groups.

10. The method of claim 9, wherein the receiving the plurality of TCI states further comprises:
receiving, from the network entity, a radio resource control (RRC) configuration of the plurality of TCI states.

11. The method of claim 9, further comprising:
obtaining a respective initial beam quality metric for each of the plurality of transmit beams; and
transmitting, to the network entity, an initial beam report comprising the respective initial beam quality metric of at least one transmit beam of the plurality of transmit beams.

12. The method of claim 11, wherein the receiving, from the network entity, the plurality of TCI states further comprises:
receiving, from the network entity, the plurality of TCI states in response to the initial beam report.

13. The method of claim 1, wherein the transmitting, to the network entity, the beam report indicating a plurality of beam groups further comprises:
identifying the plurality of beam groups based on the respective beam quality metric vectors; and
including the plurality of beam groups within the beam report.

14. The method of claim 1, wherein each of the plurality of transmit beams is associated with a frequency band selected from one of FR2, FR4, FR4-a, FR4-1, or FR5.

15. A method for wireless communication at a network entity in a wireless communication network, the method comprising:
receiving a beam report indicating a plurality of beam groups, each comprising two or more of a plurality of transmit beams associated with the network entity having a minimum mutual interference therebetween at a user equipment (UE) based on the respective beam quality metrics, the beam report comprising a respective beam quality metric vector for each of the plurality of transmit beams, each of the respective beam quality metric vectors comprising a respective individual beam quality metric associated with each receive beam of a plurality of receive beams on the UE during a measurement period; and
providing a plurality of transmission configuration indicator (TCI) state groups for the UE, each of the plurality of TCI state groups corresponding to a respective one of the plurality of beam groups.

16. The method of claim 15, wherein the providing the plurality of TCI state groups further comprises:
providing a radio resource control (RRC) configuration of the plurality of TCI state groups.

17. The method of claim 15, further comprising:
providing an activation message activating a set of active TCI state groups of the plurality of TCI state groups at the UE.

18. The method of claim 17, wherein the activation message comprises a medium access control-control element (MAC-CE).

19. The method of claim 17, wherein the set of active TCI state groups comprises up to eight of the plurality of TCI state groups.

20. The method of claim 17, further comprising:
providing control information comprising an active TCI state group of the set of active TCI state groups associated with an assignment of resources for spatial division multiplexing of a plurality of streams to the UE.

21. The method of claim 20, wherein each of the plurality of transmit beams corresponds to one of a plurality of transmission and reception points (TRPs) associated with the network entity, and further comprising:
providing each of the plurality of streams associated with a different respective one of the plurality of TRPs using an active beam group of the plurality of beam groups associated with the active TCI state group.

22. The method of claim 20, wherein the control information comprises three bits indicating the active TCI state group.

23. The method of claim 15, further comprising:
transmitting a plurality of TCI states, each associated with a respective one of the plurality of transmit beams, wherein each of the plurality of TCI state groups comprises a respective one of the plurality of TCI states for each of the plurality of transmit beams within the respective one of the plurality of beam groups.

24. The method of claim 23, wherein the transmitting the plurality of TCI states further comprises:
receiving an initial beam report comprising a respective initial beam quality metric of at least one transmit beam of the plurality of transmit beams; and
providing the plurality of TCI states in response to the initial beam report.

25. The method of claim 15, further comprising:
grouping the plurality of transmit beams into the plurality of beam groups based on the respective beam quality metric vectors.

26. The method of claim 15, wherein the beam report comprises the plurality of beam groups, and further comprising:
grouping the plurality of transmit beams into the plurality of beam groups in accordance with the plurality of beam groups included within the beam report.

27. A user equipment (UE) configured for wireless communication, comprising:
a processor; and
a memory coupled to the processor, the processor configured to:
for each transmit beam of a plurality of transmit beams associated with a network entity, obtain a respective individual beam quality metric on each receive beam of a plurality of receive beams on the UE during a measurement period to produce a respective beam quality metric vector for each of the plurality of transmit beams, each beam quality metric vector comprising the respective individual beam quality metrics obtained for each of the plurality of receive beams;

transmit, to the network entity, a beam report comprising the respective beam quality metric vector for each of the plurality of transmit beams, the beam report indicating a plurality of beam groups based on the respective beam quality metric vectors, each of the plurality of beam groups comprising two or more of the plurality of transmit beams having a minimum mutual interference therebetween based on the respective beam quality metric vectors; and receive, from the network entity, a plurality of transmission configuration indicator (TCI) state groups, each of the plurality of TCI state groups corresponding to a respective one of the plurality of beam groups.

28. The UE of claim 27, further comprising:

a transceiver coupled to the processor and the memory, and wherein the processor is further configured to:

receive, from the network entity via the transceiver, an activation message activating a set of active TCI state groups of the plurality of TCI state groups; and receive, from the network entity via the transceiver, control information comprising an active TCI state group of the set of active TCI state groups associated with an assignment of resources for spatial division multiplexing of a plurality of streams to the UE.

29. The UE of claim 28, wherein each of the plurality of transmit beams corresponds to one of a plurality of transmission and reception points (TRPs) associated with the network entity, and wherein the processor is further configured to:

receive each of the plurality of streams from a different respective one of the plurality of TRPs using an active beam group of the plurality of beam groups associated with the active TCI state group.

30. The UE of claim 28, wherein the control information comprises three bits indicating the active TCI state group.

31. The UE of claim 27, wherein the processor is further configured to:

identify the plurality of beam groups based on the respective beam quality metric vectors; and include the plurality of beam groups within the beam report.

32. A network entity configured for wireless communication, comprising:

a processor; and a memory coupled to the processor, wherein the processor is configured to:

receive a beam report indicating a plurality of beam groups, each comprising two or more of a plurality of transmit beams associated with the network entity having a minimum mutual interference therebetween based on the respective beam quality metrics the beam report comprising a respective beam quality metric vector for each of the plurality of transmit beams, each of the respective beam quality metric vectors comprising a respective individual beam quality metric associated with each receive beam of a plurality of receive beams on the UE during a measurement period; and transmit, to the UE, a plurality of transmission configuration indicator (TCI) state groups, each of the plurality of TCI state groups corresponding to a respective one of the plurality of beam groups.

33. The network entity of claim 32, wherein the processor is further configured to:

provide an activation message activating a set of active TCI state groups of the plurality of TCI state groups at the UE; and provide control information comprising an active TCI state group of the set of active TCI state groups associated with an assignment of resources for spatial division multiplexing of a plurality of streams to the UE.

34. The network entity of claim 33, wherein the control information comprises three bits indicating the active TCI state group.

35. The network entity of claim 32, wherein the processor is further configured to:

group the plurality of transmit beams into the plurality of beam groups based on the respective beam quality metric vectors.

36. The network entity of claim 32, wherein the beam report comprises the plurality of beam groups, and wherein the processor is further configured to:

group the plurality of transmit beams into the plurality of beam groups in accordance with the plurality of beam groups included within the beam report.

37. A non-transitory computer-readable medium having stored therein instructions executable by one or more processors of a user equipment (UE) to:

for each transmit beam of a plurality of transmit beams associated with a network entity, obtain a respective individual beam quality metric on each receive beam of a plurality of receive beams on the UE during a measurement period to produce a respective beam quality metric vector for each of the plurality of transmit beams, each beam quality metric vector comprising the respective individual beam quality metrics obtained for each of the plurality of receive beams;

transmit, to the network entity, a beam report comprising the respective beam quality metric vector for each of the plurality of transmit beams, the beam report indicating a plurality of beam groups based on the respective beam quality metric vectors, each of the plurality of beam groups comprising two or more of the plurality of transmit beams having a minimum mutual interference therebetween based on the respective beam quality metric vectors; and receive, from the network entity, a plurality of transmission configuration indicator (TCI) state groups, each of the plurality of TCI state groups corresponding to a respective one of the plurality of beam groups.

38. The non-transitory computer-readable medium of claim 37, further comprising instructions executable by the one or more processors of the UE to:

receive, from the network entity, an activation message activating a set of active TCI state groups of the plurality of TCI state groups; and receive, from the network entity, control information comprising an active TCI state group of the set of active TCI state groups associated with an assignment of resources for spatial division multiplexing of a plurality of streams to the UE.

39. The non-transitory computer-readable medium of claim 38, wherein each of the plurality of transmit beams corresponds to one of a plurality of transmission and reception points (TRPs) associated with the network entity, and further comprising instructions executable by the one or more processors of the UE to:

receive each of the plurality of streams from a different respective one of the plurality of TRPs using an active beam group of the plurality of beam groups associated with the active TCI state group.

40. The non-transitory computer-readable medium of claim 38, wherein the control information comprises three bits indicating the active TCI state group.

41. The non-transitory computer-readable medium of claim 37, further comprising instructions executable by the one or more processors of the UE to:
    identify the plurality of beam groups based on the respective beam quality metric vectors metrics; and
    include the plurality of beam groups within the beam report.

42. A non-transitory computer-readable medium having stored therein instructions executable by one or more processors of a network entity to:
    receive a beam report indicating a plurality of beam groups, each comprising two or more of a plurality of transmit beams associated with the Network entity having a minimum mutual interference therebetween at a user equipment (UE) based on the respective beam quality metrics, the beam report comprising a respective beam quality metric vector for each of the plurality of transmit beams, each of the respective beam quality metric vectors comprising a respective individual beam quality metric associated with each receive beam of a plurality of receive beams on the UE during a measurement period; and
    provide a plurality of transmission configuration indicator (TCI) state groups for the UE, each of the plurality of TCI state groups corresponding to a respective one of the plurality of beam groups.

43. The non-transitory computer-readable medium of claim 42, further comprising instructions executable by the one or more processors of the network entity to:
    provide an activation message activating a set of active TCI state groups of the plurality of TCI state groups at the UE; and
    provide control information comprising an active TCI state group of the set of active TCI state groups associated with an assignment of resources for spatial division multiplexing of a plurality of streams to the UE.

44. The non-transitory computer-readable medium of claim 43, wherein the control information comprises three bits indicating the active TCI state group.

45. The non-transitory computer-readable medium of claim 42, further comprising instructions executable by the one or more processors of the network entity to:
    group the plurality of transmit beams into the plurality of beam groups based on the respective beam quality metric vectors.

46. The non-transitory computer-readable medium of claim 42, wherein the beam report comprises the plurality of beam groups, and further comprising instructions executable by the one or more processors of the network entity to:
    group the plurality of transmit beams into the plurality of beam groups in accordance with the plurality of beam groups included within the beam report.

* * * * *